US009803593B2

(12) United States Patent
Kimoto et al.

(10) Patent No.: US 9,803,593 B2
(45) Date of Patent: Oct. 31, 2017

(54) FLOW RATE CONTROL VALVE AND FUEL VAPOR PROCESSING APPARATUS INCLUDING THE SAME

(71) Applicant: AISAN KOGYO KABUSHIKI KAISHA, Obu-shi, Aichi-ken (JP)

(72) Inventors: Junya Kimoto, Obu (JP); Shinji Murai, Aichi-ken (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 0 days.

(21) Appl. No.: 14/900,724

(22) PCT Filed: Jun. 26, 2014

(86) PCT No.: PCT/JP2014/067012
§ 371 (c)(1),
(2) Date: Dec. 22, 2015

(87) PCT Pub. No.: WO2015/002063
PCT Pub. Date: Jan. 8, 2015

(65) Prior Publication Data
US 2016/0146159 A1    May 26, 2016

(30) Foreign Application Priority Data

Jul. 2, 2013   (JP) ................ 2013-138942
Dec. 25, 2013  (JP) ................ 2013-266331

(51) Int. Cl.
*F02M 25/08*   (2006.01)
*F16K 31/04*   (2006.01)
(Continued)

(52) U.S. Cl.
CPC ... *F02M 25/0836* (2013.01); *B60K 15/03519* (2013.01); *F02M 25/08* (2013.01);
(Continued)

(58) Field of Classification Search
CPC ............ F02M 25/08; F02M 25/0836; F02M 25/0854; F02M 37/00; F16K 1/32;
(Continued)

(56) References Cited

U.S. PATENT DOCUMENTS 4,120,480 A * 10/1978 Ando ............... F02M 26/67
                                              123/568.29
6,220,230 B1   4/2001 Kawamura et al.
(Continued)

FOREIGN PATENT DOCUMENTS

JP    H09-4744 A    1/1997
JP    H10-89520 A   4/1998
(Continued)

OTHER PUBLICATIONS

International Patent Application No. PCT/JP2014/067012 International Search Report dated Sep. 9, 2014 (5 pages).

*Primary Examiner* — John Kwon
*Assistant Examiner* — Johnny H Hoang
(74) *Attorney, Agent, or Firm* — Conley Rose, P.C.

(57) ABSTRACT

A flow rate control valve includes: a valve casing forming a fluid passage; a valve seat provided in the fluid passage; a stepping motor; a valve guide stroke-controlled by the stepping motor via a feed screw mechanism; a valve body configured to be placed and separated on and from the valve seat; a connector connecting the valve guide and the valve body so as to allow them to move in an axial direction within a predetermined range; a valve spring biasing the valve body in a closing direction. When closing the valve body, ECU controls the motor to a closed state such that a connection between the valve guide and the valve body by the connector is released, with the valve body being seated on the valve seat, and the valve guide being situated at a non-contact position spaced away from the valve seat.

12 Claims, 16 Drawing Sheets

(51) Int. Cl.
*F16K 31/50* (2006.01)
*F16K 17/04* (2006.01)
*F02M 37/00* (2006.01)
*B60K 15/035* (2006.01)
*F16K 1/36* (2006.01)

(52) U.S. Cl.
CPC ........ *F02M 25/0854* (2013.01); *F02M 37/00* (2013.01); *F16K 1/36* (2013.01); *F16K 17/048* (2013.01); *F16K 31/04* (2013.01); *F16K 31/508* (2013.01)

(58) Field of Classification Search
CPC ...... F16K 17/048; F16K 31/04; F16K 31/508; B60K 15/03519
USPC ........... 123/516–521; 137/306, 512.2, 512.3; 251/321
See application file for complete search history.

(56) References Cited

U.S. PATENT DOCUMENTS

| | | | |
|---|---|---|---|
| 6,321,776 B1 * | 11/2001 | Pratt | F16K 7/14 137/312 |
| 8,506,692 B2 | 8/2013 | Sugiura | |
| 2011/0168931 A1 * | 7/2011 | Sugiura | F16K 1/443 251/129.15 |
| 2012/0223265 A1 * | 9/2012 | Sawada | F16K 7/16 251/263 |
| 2012/0248355 A1 * | 10/2012 | Harada | F16K 31/04 251/129.11 |
| 2013/0142675 A1 * | 6/2013 | Nabei | F16K 31/046 417/271 |
| 2013/0319379 A1 * | 12/2013 | Hettinger | F16K 39/024 123/520 |
| 2015/0014559 A1 * | 1/2015 | Vrolijk | F23N 1/042 251/129.11 |
| 2015/0159566 A1 * | 6/2015 | Akita | F02D 41/003 137/488 |
| 2015/0159567 A1 * | 6/2015 | Akita | F02D 41/003 137/624.27 |

FOREIGN PATENT DOCUMENTS

| | | |
|---|---|---|
| JP | 2000-73883 A | 3/2000 |
| JP | 2000-179731 A | 6/2000 |
| JP | 2011-252586 A | 12/2011 |
| JP | 2012-97711 A | 5/2012 |
| JP | 2013-40626 A | 2/2013 |

* cited by examiner

FLOW RATE CONTROL VALVE AND FUEL VAPOR PROCESSING APPARATUS INCLUDING THE SAME

CROSS-REFERENCE TO RELATED APPLICATIONS

The present application is a National Phase entry of, and claims priority to, PCT Application No. PCT/JP2014/067012, filed Jun. 26, 2014, which claims priority to Japanese Patent Application No. 2013-138942, filed Jul. 2, 2013, and Japanese Patent Application No. 2013-266331, filed Dec. 25, 2013, the contents of each being incorporated herein by reference in their entireties for all purposes.

STATEMENT REGARDING FEDERALLY SPONSORED RESEARCH OR DEVELOPMENT

Not applicable.

BACKGROUND

The present invention relates to a flow rate control valve and/or a fuel vapor processing apparatus including the flow rate control valve.

Conventionally, there exists fuel vapor processing apparatuses including: a canister that may adsorb and desorb vapor generated in the fuel tank of a vehicle on that an internal combustion engine is mounted; a vapor passage connecting the fuel tank and the canister; a purge passage connecting the canister and an intake passage of the internal combustion engine; a purge valve capable of opening and closing the purge passage; a closing valve capable of opening and closing the vapor passage; and a controller configured to control the purge valve and the closing valve (See, for example, Japanese Laid-Open Patent Publication No. 2000-73883). In Japanese Laid-Open Patent Publication No. 2000-73883, the closing valve (to which the "bypass valve" of Japanese Laid-Open Patent Publication No. 2000-73883 corresponds) is driven to be opened and closed by a stepping motor. A general flow rate control valve driven to be opened and closed by a stepping motor includes a valve casing configured to form a fluid passage, a valve seat installed in the fluid passage of the valve casing, an electric motor installed in the valve casing and configured to be drive-controlled by the controller, a valve body axially stroke-controlled via a feed screw mechanism by the electric motor to be placed and separated on and from the valve seat, and a spring for biasing the valve body in a closing direction.

When the flow rate control valve is in a valve-closed state, electricity supply to the stepping motor is stopped while the valve body is seated on the valve seat. As a result, the valve seat of the valve casing, the stepping motor and the feed screw mechanism may regulate the movement of the valve body in the axial direction. In this state, a change in dimension in the valve casing, in particular, a change in dimension in the axial direction of the valve body may be generated due to a change in temperature. When, for example, the valve casing expands in the axial direction of the valve body, the distance between the stepping motor and the valve seat increases, and the sealing force between the valve body and the valve seat is reduced. When the valve casing is reduced in the axial direction of the valve body, the distance between the stepping motor and the valve seat is reduced. At this time, the valve body gets cramped up, so that there is a fear of defective operation.

To eliminate the above problem, it might be possible to set the lead angle of the feed screw mechanism large to thereby increase the spring force of the spring. Then, in the so-called non-electricity-supply state in which the electricity supply to the stepping motor is stopped, the motor side member of the feed screw mechanism would be rotated as the valve body is pressed against the valve seat. This may maintain the valve body to be seated on the valve seat to solve the above problem. That, however, involves the following problems: (1) a stepping motor of large thrust is required, resulting in an increase in size and cost; (2) also when keeping the valve body at rest in the open state at the time of fuel supply, depressurization control, etc., electricity supply is required, resulting in involvement of power consumption; and (3) the stroke amount of the valve body per 1 step of the stepping motor (the stroke resolution) increases, resulting in deterioration in flow rate control property.

It is an object of the present invention to provide a flow rate control valve capable of avoiding the problem due to a change in the dimension of the valve casing in the closed state, and a fuel vapor processing apparatus including the flow rate control valve.

BRIEF SUMMARY

According to a first aspect of the invention, there is provided a flow rate control valve may include: a valve casing forming a fluid passage; a valve seat provided in the fluid passage of the valve casing; an electric motor mounted on the valve casing and drive-controlled by a controller; a valve guide stroke-controlled in an axial direction by the electric motor via a feed screw mechanism; a valve body configured to be placed and separated on and from the valve seat; a connector connecting the valve guide and the valve body so as to allow them to move in the axial direction within a predetermined range; a biasing means configured to bias the valve body in a closing direction; and a contact portion provided on the valve casing and configured to limit the movement in the closing direction of the valve guide through contacting the valve guide, wherein, when closing the valve body, the controller controls the electric motor to a closed state such that a connection between the valve guide and the valve body by the connector is released, with the valve body being seated on the valve seat, and the valve guide being situated at a non-contact position spaced away from the contact portion of the valve casing.

In this construction, in the closed state, the connection between the valve guide and the valve body through the connector is released, with the valve body being seated on the valve seat, and the valve guide is situated at the non-contact position spaced away from the contact portion of the valve casing. In the closed state, when the valve casing is expanded in the axial direction of the valve body due, for example, to a change in temperature, the valve body is moved in the closing direction with respect to the valve guide due to the biasing of the biasing means as the distance between the electric motor and the valve seat increases. Thus, the sealing force between the valve body and the valve seat may be maintained. When the valve casing is contracted in the axial direction of the valve body, the valve body is moved in an opening direction with respect to the valve guide against the biasing of the biasing means as the distance between the electric motor and the valve seat decreases. Thus, the valve body is not forcibly contacted to the valve seat, causing no defective operation. This may avoid the problem due to a change in the dimension of the valve casing in the closed state. Further, the lead angle of the feed screw mechanism may be set small, so that unlike the countermeasure in which the lead angle is set large, there is no need for an electric motor of large thrust, making it possible to sustain an increase in size and cost. Further, in the non-electricity-supply state of the electric motor, the valve body is maintained at a predetermined position without being inadvertently opened or closed, so that it is possible to suppress power consumption. Further, the stroke resolution of the valve body may be reduced, making it possible to improve the flow rate control property.

According to a second aspect of the invention, there is provided a flow rate control valve according to the first aspect of the invention, wherein, when closing the valve body, the controller may cause the electric motor to perform a valve closing operation to thereby place the valve body on the valve seat, and then the valve guide is further moved in the closing direction, whereby the connection between the valve guide and the valve body through the connector is released before the valve closing operation of the electric motor is stopped, with the flow rate control valve being placed in the closed state before the valve guide comes into contact with the contact portion of the valve casing.

According to a third aspect of the invention, there is provided a flow rate control valve according to the first aspect of the invention, wherein, when closing the valve body, the controller may cause the electric motor to perform a valve closing operation to thereby place the valve body on the valve seat, and then the valve guide is further moved in the closing direction, whereby the connection between the valve guide and the valve body through the connector is released, further the controller may cause the electric motor to perform a valve opening operation after the valve guide contacts the contact portion of the valve casing to thereby place the valve guide at a position spaced away from the contact portion of the valve casing, with the flow rate control valve being placed in the closed state when the valve opening operation of the electric motor is stopped.

According to a fourth aspect of the invention, there is provided a flow rate control valve according to one of the first through third aspects of the invention, wherein the connector may include a connection protrusion provided on one of the valve guide and the valve body and a connection recess provided on the other and configured to be engaged with the connection protrusion so as to allow movement in the axial direction within a predetermined range. In this construction, through engagement of the connection protrusion and the connection recess of the connector, the valve guide and the valve body may be connected each other to allow movement in the axial direction within a predetermined range. As a result, the valve guide and the valve body may be easily connected each other.

According to a fifth aspect of the invention, there is provided a flow rate control valve according to the fourth aspect of the invention, wherein the connection recess may include an opening configured to allow the connection protrusion to get in and out through relative displacement around the axis while the valve body is moved in an opening direction with respect to the valve guide; and the opening of the connection recess and the connection protrusion are arranged in a positional relationship in which they are not aligned in the opening and/or closing operation. In this construction, through relative displacement around the axis while the valve body is moved in the opening direction with respect to the valve guide, the connection protrusion may be engaged and disengaged with and from the connection recess through the opening. As a result, the connection protrusion and the connection recess may be easily engaged and disengaged without having to utilize elastic deformation. Further, the opening of the connection recess and the connection protrusion are arranged in a positional relationship in which they are not aligned in the opening and/or closing operation. Thus, inadvertent detachment of the connection protrusion from the connection recess in relation to the opening and/or closing operation may be prevented.

According to a sixth aspect of the invention, there is provided a flow rate control valve according to the fifth aspect of the invention, wherein the valve body may have a tool engagement portion configured to be detachably engaged with a tool for rotating and/or pressing the valve body. In this construction, when mounting the valve body to the valve guide, the tool is engaged with the tool engagement portion of the valve body, and the valve body is rotated while being pressed against the valve guide by the tool, thereby the valve body may be mounted to the valve guide. Thus, unlike the case where the valve body is directly mounted to the valve guide through manual operation by the operator, it is possible to suppress such problems as adhesion of foreign matter to the valve body and flawing of the valve body.

According to a seventh aspect of the invention, there is provided a flow rate control valve according to the fourth aspect of the invention, wherein the valve guide may have a tubular tube wall portion, and the valve body may have a tube wall portion to be fit-engaged with the tube wall portion of the valve guide; the connector is provided between the tube wall portion of the valve guide and the tube wall portion of the valve body; the connection protrusion protrudes radially outwards from the tube wall portion of the valve body; and the connection recess is open radially inwards on an inner peripheral side of the tube wall portion of the valve guide. In this construction, unlike the case where the connection protrusion is engaged and disengaged with and from the connection recess around the axis, the axial space required for such an engagement and disengagement may be omitted. Thus, the configuration of the connection recess may be simplified and the valve guide may be compact in the axial direction.

According to an eighth aspect of the invention, there is provided a flow rate control valve according to the seventh aspect of the invention, wherein the valve guide may be divided into two so that the connection recess is opened in the axial direction; and resultant two members are bonded together while accommodating the connection protrusion in the connection recess. In this construction, the two members are bonded together while accommodating the connection protrusion in the connection recess to thereby form the valve guide. Thus, the connection protrusion and the connection recess of the connector can be easily connected together.

According to a ninth aspect of the invention, there is provided a flow rate control valve according to one of the first through eighth aspects of the invention, wherein the biasing means may be an elastic member provided between the valve guide and the valve body. In this construction, as compared with the case where the weight of the valve body, the repulsive force of a magnet, etc. is used as the biasing means, the valve body may be biased in the closing direction in a stable manner by the elastic member constituting the biasing means.

According to a tenth aspect of the invention, there is provided a flow rate control valve according to the ninth aspect of the invention, wherein the elastic member may be a coil spring arranged concentrically with respect to the valve guide and the valve body. In this construction, inclination of the valve body generated due to design toleration, mounting, etc. can be absorbed by the coil spring. As a result, the sealing property at the time of valve closing may be improved.

According to an eleventh aspect of the invention, there is provided a flow rate control valve according to the tenth aspect of the invention, wherein the valve body may have a tubular tube wall portion arranged on an outer peripheral side of the coil spring; and the valve guide may have a wall portion to be fit-engaged with an outer peripheral side of the tube wall portion of the valve body. In this construction, through the fit-engagement of the tube wall portion of the valve body and the wall portion of the valve guide, the valve body and the valve guide may move in the axial direction in a stable manner while suppressing swing thereof in a radial direction.

According to a twelfth aspect of the invention, there is provided a fuel vapor processing apparatus which may include a canister capable of adsorbing and desorbing vapor generated in a fuel tank of a vehicle with an internal combustion engine mounted therein; a vapor passage configured to allow fluid communication between the fuel tank and the canister; a purge passage configured to allow fluid communication between the canister and an intake passage of the internal combustion engine; a purge valve capable of opening and closing the purge passage; a closing valve capable of opening and closing the vapor passage; and a controller configured to control the purge valve and the closing valve, wherein the fuel vapor processing apparatus may further include a closing valve according to the first through eleventh aspects of the invention. In this construction, it is possible to provide a fuel vapor processing apparatus including, as the closing valve, a flow rate control valve capable of avoiding problems due to a change in the dimension of a valve casing in the closed state.

DETAILED DESCRIPTION

Embodiments of the present invention will be described below with reference to the drawings.

The First Embodiment will now be described. A flow rate control valve in accordance with the present embodiment is provided for a closing valve in a fuel vapor processing apparatus mounted in a vehicle such as an automobile in which an internal combustion engine (engine) is also mounted. Thus, the flow rate control valve as the closing valve will be described after describing the fuel vapor processing apparatus.

Figure 1:
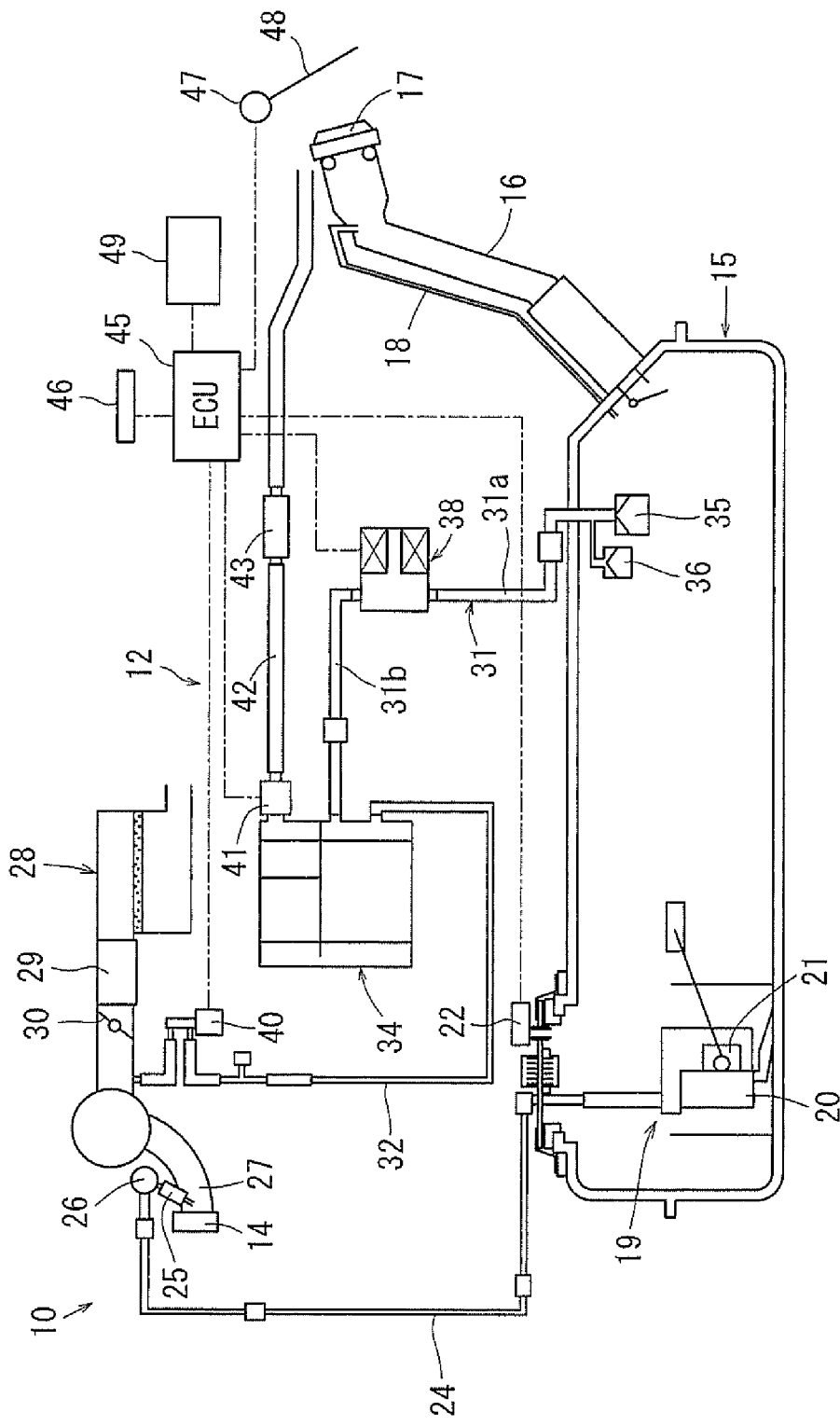
FIG. 1 is a diagram illustrating a fuel vapor processing apparatus in accordance with a first embodiment.

The fuel vapor processing apparatus will be described. FIG. 1 is a diagram illustrating the fuel vapor processing apparatus 12. As shown in FIG. 1, a fuel vapor processing apparatus 12 is provided in an engine system 10 of a vehicle such as an automobile. The engine system 10 may include an engine 14, and a fuel tank 15 storing fuel to be supplied to the engine 14. The fuel tank 15 is provided with an inlet pipe 16. The inlet pipe 16 is a pipe introducing fuel into the fuel tank 15 via a fuel supply port at the upper end portion thereof. A tank cap 17 may be detachably mounted to the fuel supply port. Further, an interior of an upper end portion of the inlet pipe 16 may be in fluid communication with an air layer portion within the fuel tank 15 via a breather pipe 18.

A fuel supply device 19 is situated in the fuel tank 15. The fuel supply device 19 may include a fuel pump 20 configured to suck in the fuel in the fuel tank 15 and to discharge the fuel after pressurizing the fuel, a sender gauge 21 detecting the surface level of the fuel, a tank inner pressure sensor 22 detecting the tank inner pressure as a relative pressure to the atmospheric pressure, etc. The fuel drawn from the interior of the fuel tank 15 by the fuel pump 20 is supplied to the engine 14 via a fuel supply passage 24, more specifically, to a delivery pipe 26 equipped with an injector (fuel injection valve) 25 corresponding to each combustion chamber before being injected into an intake passage 27 from each injector 25. An air cleaner 28, an air flow meter 29, a throttle valve 30, etc may be provided in the intake passage 27.

The fuel vapor processing apparatus 12 may include a vapor passage 31, a purge passage 32, and a canister 34. One end portion (upstream side end portion) of the vapor passage 31 may be in fluid communication with the air layer portion in the fuel tank 15. The other end portion (downstream side end portion) of the vapor passage 31 may be in fluid communication with the interior of the canister 34. Further, one end portion (upstream side end portion) of the purge passage 32 may be in fluid communication with the interior of the canister 34. The other end portion (downstream side end portion) of the purge passage 32 may be in fluid communication with the portion of the intake passage 27 on the downstream side of the throttle valve 30. The canister 34 is loaded with activated carbon (not shown) as adsorbent material. The adsorbent material (activated carbon) in the canister 34 may adsorb the fuel vapor in the fuel tank 15 through the vapor passage 31.

An ORVR valve (On Board Refueling Vapor Recovery valve) 35 and a fuel cut off valve 36 may be provided at the upstream side end portion of the vapor passage 31, in the air layer portion of the fuel tank 15. The ORVR valve 35 is a tank filling-up regulation valve comprising of a float valve opened and closed due to the buoyancy of the fuel. The valve is open when the fuel surface level of the fuel tank 15 is less than the full surface level, and is closed when the fuel surface level is raised to the full surface level through fuel supply, whereby the vapor passage 31 is cut off. When the vapor passage 31 is cut off by the ORVR valve 35, the fuel fills up to the inlet pipe 16, and an automatic stop mechanism of a fuel supply gun operates to stop the fuel supply. The cut off valve 36 may comprise a float valve configured to be opened and closed by the buoyancy of the fuel. Normally, it is maintained in the open state; it is closed at the time of rolling of the vehicle to thereby prevent the fuel in the fuel tank 15 from flowing out into the vapor passage 31.

A closing valve 38 is provided at a point along the vapor passage 31. That is, the vapor passage 31 is divided at the point thereof into a fuel tank 15 side passage portion 31a and a canister 34 side passage portion 31b. And the closing valve 38 is provided between the downstream side end portion of the fuel tank 15 side passage portion 31a and the upstream side end portion of the canister 34 side passage portion 31b. For example, an electric valve may be employed as the closing valve 38 wherein the electric valve includes a stepping motor and may adjust a valve opening amount through stroke control of the valve body. The closing valve 38 will be described below.

A purge valve 40 may be provided at a point along the purge passage 32. The purge valve 40 undergoes opening/closing control, i.e., so-called purge control, at a valve opening amount corresponding to a purge flow rate calculated by an engine control unit (hereinafter referred to as the "ECU") 45. For example, an electric valve may be employed as the purge valve 40 wherein the electric valve may include a stepping motor and adjust a valve-opening amount through stroke control of the valve body. An electromagnetic valve may also be employed as the purge valve 40 wherein the electromagnetic valve may include an electromagnetic solenoid and be configured to be closed in the non-excited state and to be opened when excited.

An atmosphere passage 42 may connect with the canister 34 via a switching valve 41. The other end portion of the atmosphere passage 42 is open to the atmosphere. Further, an air filter 43 is provided at a point along the atmosphere passage 42. The switching valve 41 is controlled to be opened and closed by the ECU 45. An electromagnetic valve may be employed as the switching valve 41 wherein the electromagnetic valve may include an electromagnetic solenoid and be configured to be closed in the non-excited state and to be opened when excited.

Not only the tank inner pressure sensor 22, the closing valve 38, the purge valve 40, and the switching valve 41, but also a lid switch 46, a lid opener 47, a display device 49, etc. may be connected to the ECU 45. A lid manual opening/closing device (not shown) is connected to the lid opener 47 for manually opening and closing a lid 48 covering the fuel supply port. The lid switch 46 outputs a signal to the ECU 45 for releasing the lock of the lid 48. The lid opener 47 is a lock mechanism for the lid 48. The lid opener 47 opener releases the lock of the lid 48 when a signal for releasing the lock is supplied from the ECU 45 or when the lid manual opening/closing device undergoes opening operation. The tank inner pressure sensor 22 may correspond to a "tank inner pressure detection means" as referred to in the present specification. The ECU 45 may correspond to the "controller" as referred to in the present specification.

Next, the basic operation of the above fuel vapor processing apparatus 12 will be described.

(1) When the vehicle is parking: When the vehicle is parking, the closing valve 38 is maintained in the closed state. Thus, the fuel vapor in the fuel tank 15 does not flow into the canister 34. Nor is the air in the canister 34 allowed to flow into the fuel tank 15. At this time, the purge valve 40 and the switching valve 41 are maintained in the closed state.

(2) While the vehicle is traveling: While the vehicle is traveling, the ECU 45 executes the control to purge the fuel vapor adsorbed by the canister 34 when a predetermined purge condition is met. In this control, the purge valve 40 is opening/closing-controlled while keeping the switching valve 41 in the open state to allow fluid communication of the canister 34 with the atmosphere through the atmosphere passage 42. When the purge valve 40 is opened, the intake negative pressure of the engine 14 will be applied in the canister 34 through the purge passage 32. As a result, the fuel vapor in the canister 34 is purged to the intake passage 27 along with the air sucked through the atmosphere passage 42 to be thereby burned in the engine 14. Further, the ECU 45 places the closing valve 38 in the open state only during the purging of the fuel vapor. This may make the tank inner pressure of the fuel tank 15 to be maintained at a value in the vicinity of the atmospheric pressure.

(3) During fueling: When the lid switch 46 is operated while the vehicle is parking, the ECU 45 places the closing valve 38 in the open state. In this process, when the tank inner pressure of the fuel tank 15 is higher than the atmospheric pressure, the closing valve 38 is opened; and, at the same time, the fuel vapor in the fuel tank 15 is adsorbed by the adsorbent material in the canister 34 via the vapor passage 31. As a result, the fuel vapor may be prevented from being dissipated into the atmosphere. Thereby, the tank inner pressure of the fuel tank 15 may be reduced to a value in the vicinity of the atmospheric pressure. Further, when the tank inner pressure of the fuel tank 15 is reduced to a value in the vicinity of the atmospheric pressure, the ECU 45 outputs to the lid opener 47 a signal to release the lock of the lid 48. The lid opener 47 having received that signal releases the lock of the lid 48, whereby it is possible to open the lid 48. And, in the state in which the tank cap 17 is open while the lid 48 is open, the fuel supply to the fuel tank 15 is started. Further, the ECU 45 maintains the closing valve 38 in the open state until the fuel supply is completed (more specifically, until the lid 48 is closed). Thus, at the time of fuel supply, the fuel vapor in the fuel tank 15 passes through the vapor passage 31 to be adsorbed by the adsorbent material in the canister 34.

Figure 2:
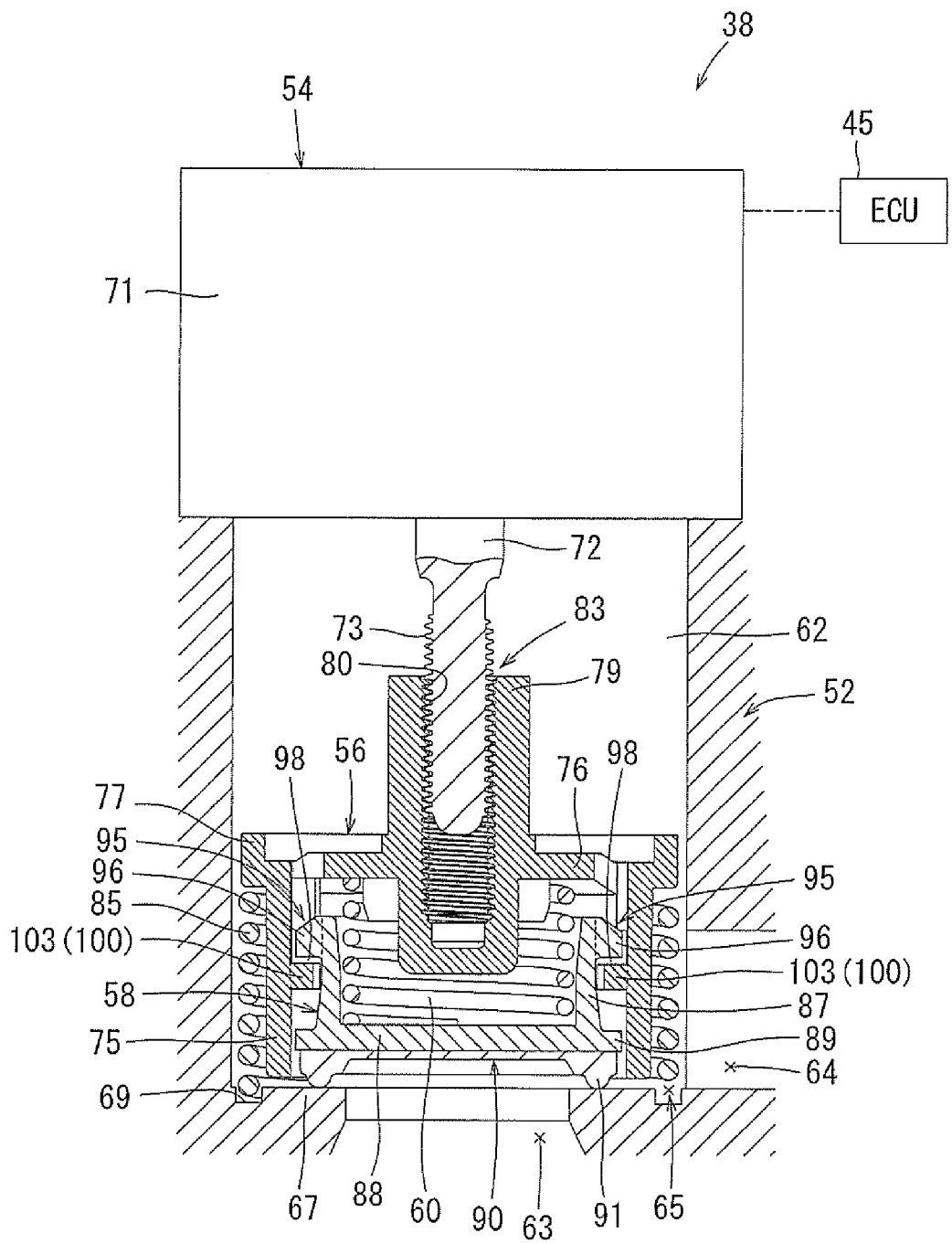
FIG. 2 is a front cross-sectional view of a flow rate control valve in a valve-closed state.
Figure 3:
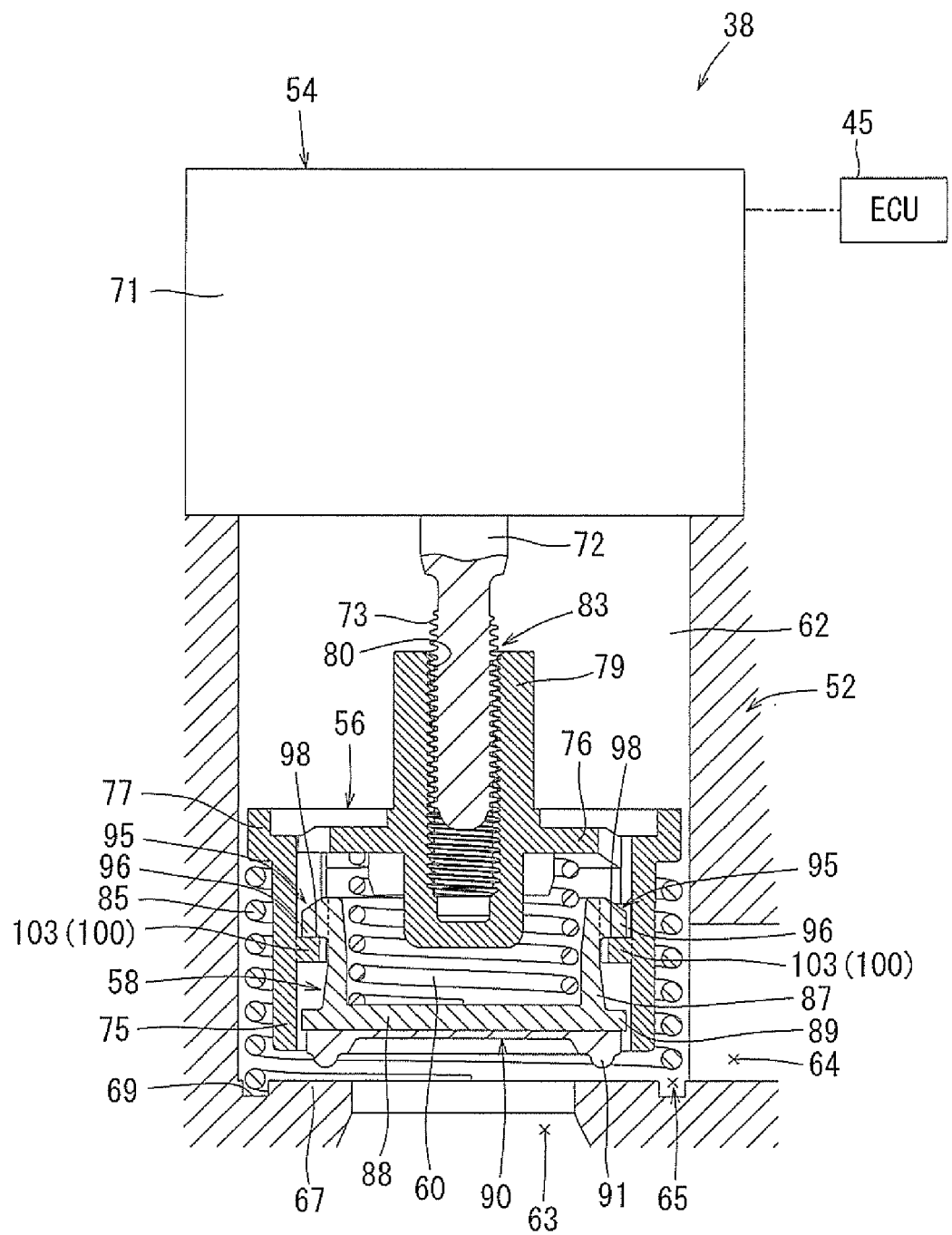
FIG. 3 is a front cross-sectional view of the flow rate control valve in a valve open state.
Figure 4:
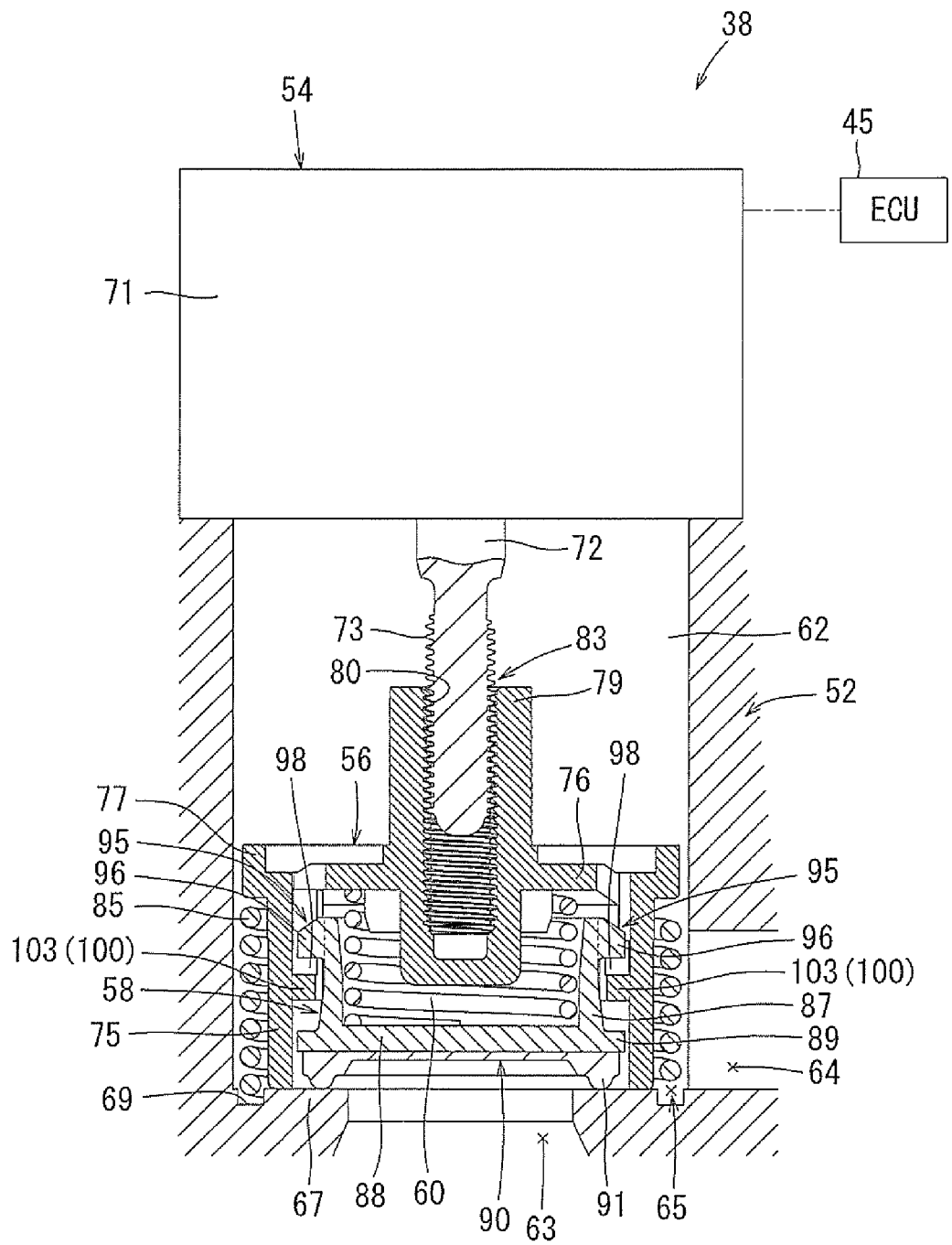
FIG. 4 is a front cross-sectional view of the flow rate control valve in an initialized state.
Figure 5:
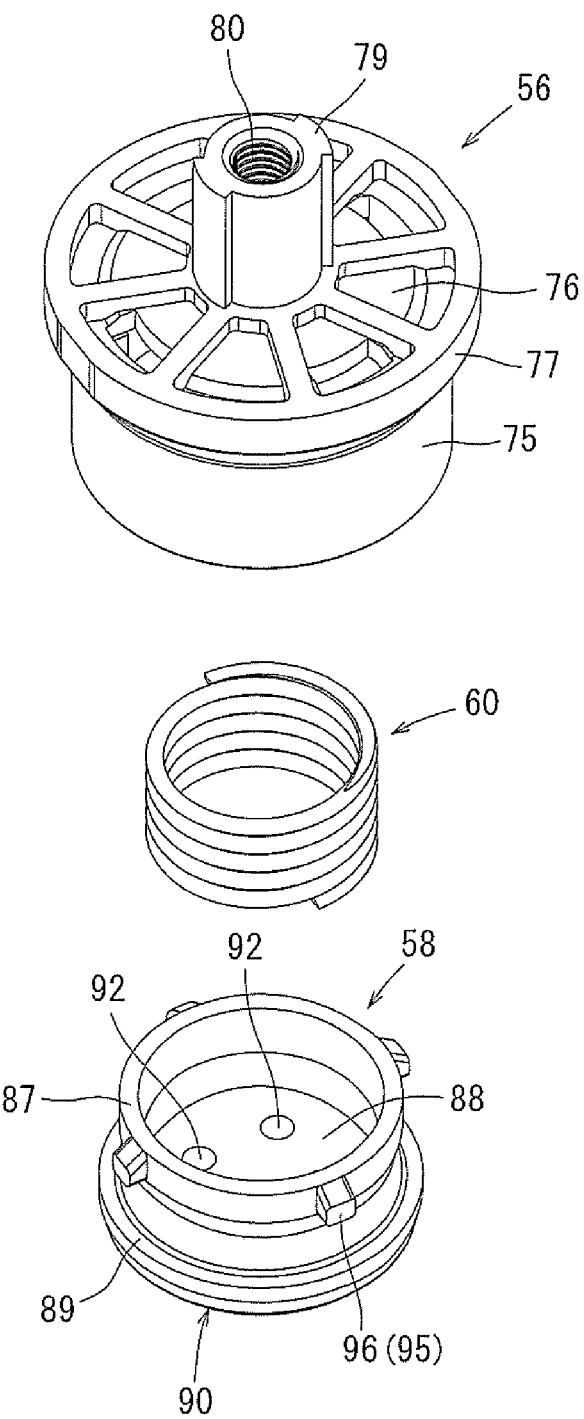
FIG. 5 is an exploded perspective view illustrating a valve guide, a valve body and a valve spring.
Figure 6:
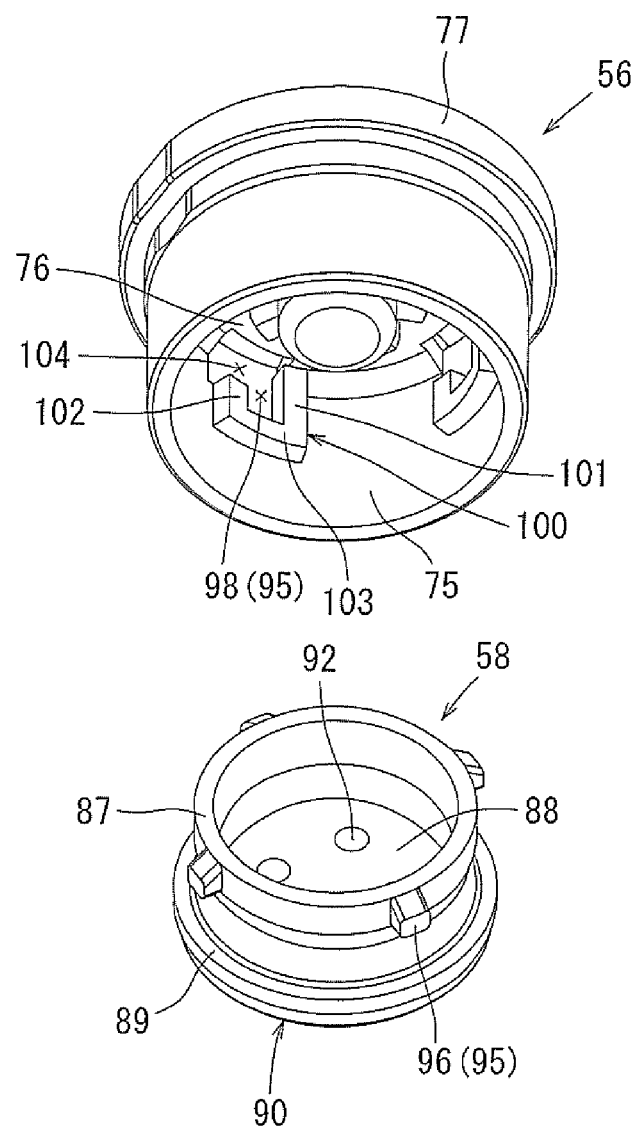
FIG. 6 is an exploded perspective view illustrating a connector between the valve guide and the valve body.
Figure 7:
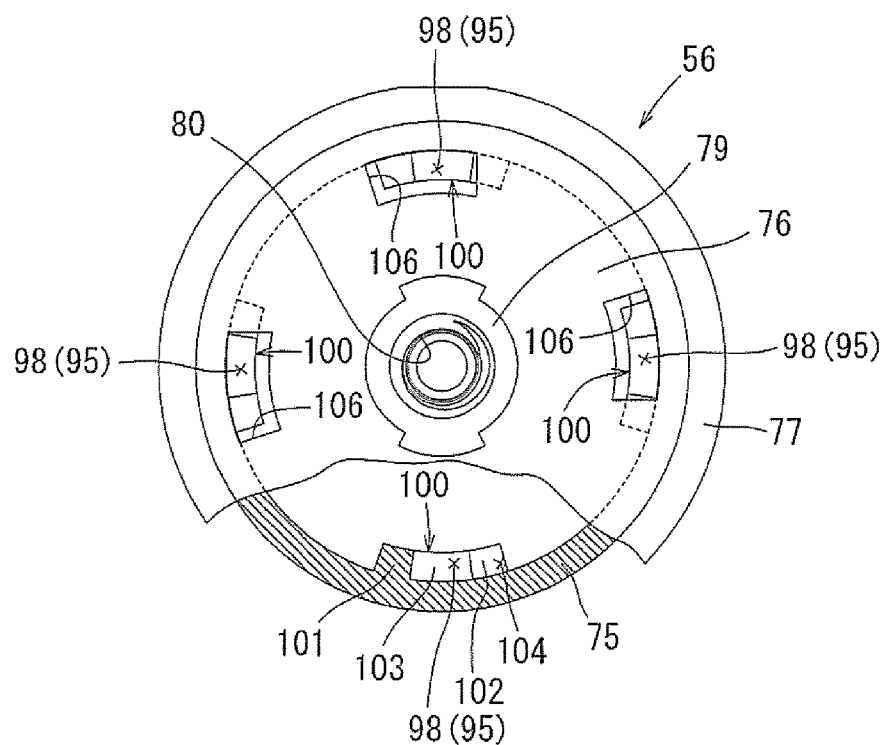
FIG. 7 is a schematic plane view, partly in section, illustrating the valve guide.
Figure 8:
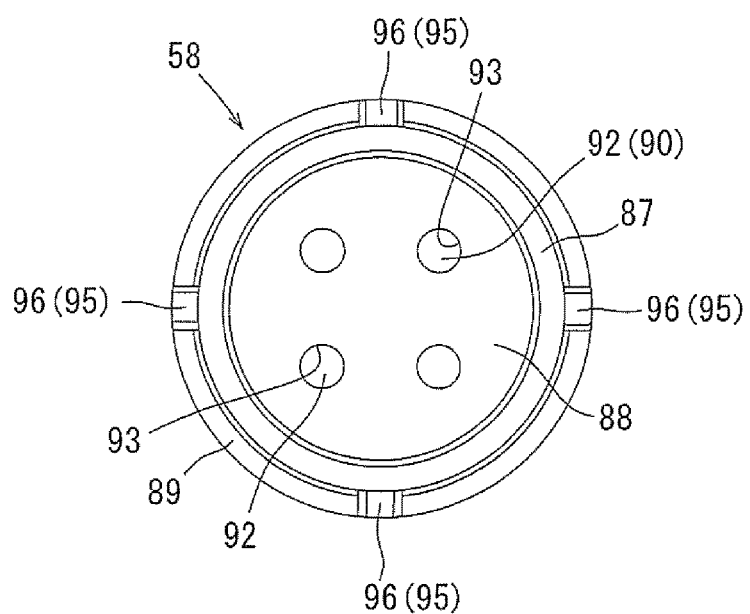
FIG. 8 is a plane view of the valve body.

Next, the flow rate control valve 38 (indicated by the same reference numeral as the closing valve) used as the closing valve 38 will be described. FIG. 2 is a front cross-sectional view of the flow rate control valve in the valve-closed state. FIG. 3 is a front cross-sectional view of the same in the valve open state. FIG. 4 is a front cross-sectional view of the same in the initialized state. FIG. 5 is an exploded perspective view illustrating a valve guide, a valve body and a valve spring. FIG. 6 is an exploded perspective view illustrating a connector between the valve guide and the valve body. FIG. 7 is a schematic plan view, partly in section, illustrating the valve guide. FIG. 8 is a plan view of the valve body. The front, rear, left, right, upper, and lower sides of the flow rate control valve 38 are determined by using FIG. 2 as a reference.

As shown in FIG. 2, the flow rate control valve 38 may include a valve casing 52, a stepping motor 54, a valve guide 56, a valve body 58, and a valve spring 60. In the following, the above components will be sequentially described. The valve casing 52 has a valve chamber 62 in the form of a hollow cylinder. An inflow passage 63 in the form of a hollow cylinder is formed concentrically at the center of the lower surface of the valve chamber 62. Further, an outflow passage 64 in the form of a hollow cylinder is formed at the lower portion of the peripheral wall surface of the valve chamber 62. The valve chamber 62, the inflow passage 63 and the outflow passage 64 may form a continuous reverse-L-shaped fluid passage 65. Further, a valve seat 67 is concentrically formed at the lower surface of the valve chamber 62, that is, at the port edge portion of the upper end opening of the inflow passage 63. The upper surface of the valve seat 67 is formed as an annular plane orthogonal to the axis of the valve chamber 62. Further, an annular spring receiving groove 69 is formed at the outer peripheral portion of the lower surface of the valve chamber 62.

The stepping motor 54 may be installed on top of the valve casing 52. The stepping motor 54 may have an output shaft 72 protruding from the lower surface of a motor main body 71 and being rotatable in a normal direction and a reverse direction. The output shaft 72 is concentrically arranged within the valve chamber 62 of the valve casing 52. A male screw portion 73 is formed on the outer peripheral surface of the output shaft 72. The stepping motor 54 may correspond to the "electric motor" as referred to in the present specification.

As shown in FIG. 5, the valve guide 56 is formed as a closed-end cylinder having a cylindrical tube wall portion 75 and an upper wall portion 76 closing the upper end opening of the tube wall portion 75. An extension wall portion 77 is formed at the upper end portion of the tube wall portion 75 to enlarge the outer diameter so as to form a stepped cylinder. A tube shaft portion 79 in the form of a bottomed cylinder is concentrically formed at the center of the upper wall portion 76. A female screw portion 80 is formed on the inner peripheral surface of the tube shaft portion 79. The tube wall portion 75 may correspond to the "wall portion" as referred to in the present specification.

As shown in FIG. 2, the valve guide 56 is arranged so that the valve guide 56 may move in the vertical direction, i.e., the axial direction while a whirl stopper (not shown) prevents the valve guide 56 from rotating around the axis with respect to the interior of the valve chamber 62 of the valve casing 52. The outer peripheral surface of the extension wall portion 77 of the tube wall portion 75 of the valve guide 56 is in close proximity to the peripheral wall portion of the valve chamber 62 with a slight gap therebetween. The tube shaft portion 79 of the valve guide 56 is threadably engaged with the output shaft 72 of the stepping motor 54. That is, the female screw portion 80 of the tube shaft portion 79 and the male screw portion 73 of the output shaft 72 are threadably engaged with each other. Thus, the normal and reverse rotation of the output shaft 72 of the stepping motor 54 causes a linear reciprocating movement of the valve guide 56 in the vertical direction (axial direction), i.e., ascending and descending of the valve guide 56. The male screw portion 73 of the output shaft 72 and the female screw portion 80 of the valve body 58 may constitute a feed screw mechanism 83.

An auxiliary spring 85 consisting of a coil spring is provided between the extension wall portion 77 of the tube wall portion 75 of the valve guide 56 and the spring receiving groove 69 of the valve casing 52. The auxiliary spring 85 is arranged concentrically on the outer peripheral side of the tube wall portion 75 of the valve guide 56. The auxiliary spring 85 constantly biases the valve guide 56 upwardly to thereby prevent backlash of the feed screw mechanism 83. The lower end surface of the tube wall portion 75 of the valve guide 56 is arranged to be capable of abutting the upper surface of the valve seat 67 of the valve casing 52.

As shown in FIG. 5, the valve body 58 is formed as a bottomed cylinder having a cylindrical tube wall portion 87 and a lower wall portion 88 closing the lower end opening of the tube wall portion 87. The lower wall portion 88 has an annular flange portion 89 protruding from the outer peripheral surface of the tube wall portion 87 (See FIG. 8). A seal member 90 that may consist of a disc-shaped rubber-like elastic member is attached to the lower surface of the lower wall portion 88. An annular seal portion 91 (See FIG. 2) protrudes from the outer peripheral portion of the lower surface of the seal member 90. A plurality of (e.g., four) columnar fit-engagement protrusions 92 protruding from the upper surface of the seal member 90 are respectively fit-engaged with mounting holes 93 formed in the lower wall portion 88 (See FIG. 8).

As shown in FIG. 2, the valve body 58 is arranged concentrically within the valve guide 56 to be vertically movable. The outer peripheral surface of the flange portion 89 of the lower wall portion 88 is in close proximity to the inner wall surface of the tube wall portion 75 of the valve guide 56 with a slight gap therebetween. The tube wall portion 87 of the valve body 58 and the tube wall portion 75 of the valve guide 56 are fit-engaged with each other to form a double tube with inner and outer portions. The seal portion 91 of the seal member 90 is arranged to be able to contact the upper surface of the valve seat 67 of the valve casing 52. A connector 95 is provided between the valve guide 56 and the valve body 58 to connect the two members 56 and 58 so as to allow the two members 56 and 58 to move in the axial direction within a predetermined range. The connector 95 will be described below.

As shown in FIG. 5, the valve spring 60 may consist of a coil spring. As shown in FIG. 2, the valve spring 60 is concentrically provided between the upper wall portion 76 of the valve guide 56 and the lower wall portion 88 of the valve body 58. The valve spring 60 constantly biases the valve body 58 downwards with respect to the valve guide 56, i.e., in the closing direction. The valve spring 60 is fit-engaged with the tube wall portion 87 of the valve body 58 with a slight gap therebetween. The valve spring 60 may correspond to the "biasing means" or "elastic member" as referred to in the present specification.

Figure 13:
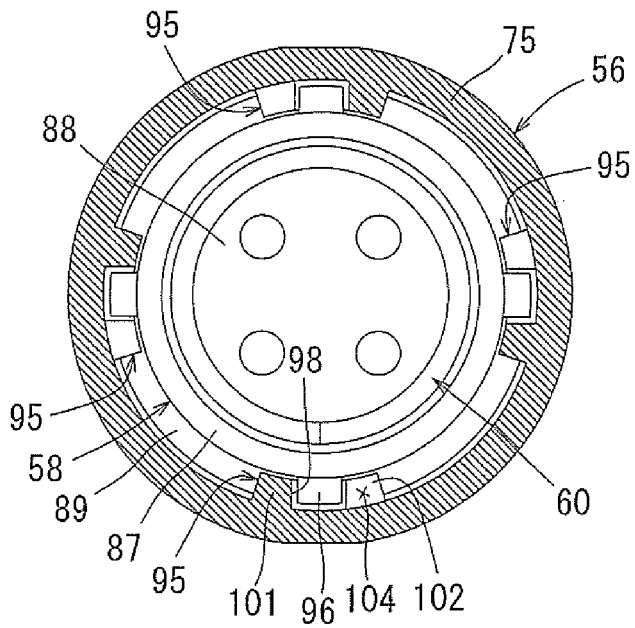
FIG. 13 is a cross-sectional view taken along line XIII-XIII in FIG. 12.

Next, the connector 95 connecting the valve guide 56 and the valve body 58 to each other will be described. As shown in FIG. 2, the connector 95 may include an engagement protrusion 96 provided on the tube wall portion 87 of the valve body 58, and an engagement groove 98 provided in the tube wall portion 75 of the valve guide 56. As shown in FIG. 13, a plurality of (e.g., four) connector 95 are arranged at equal peripheral intervals.

As shown in FIG. 6, the engagement protrusions 96 are formed as a prism protruding from the outer peripheral surface of the upper end portion of the tube wall portion 87 of the valve body 58. Four engagement protrusions 96 are arranged at equal peripheral intervals (See FIG. 8). Each engagement protrusion 96 may correspond to the "connection protrusion" as referred to in the present specification.

As shown in FIG. 6, each engagement groove 98 is formed by a substantially U-shaped groove forming wall 100 protruding from the upper inner peripheral surface of the tube wall portion 75 of the valve guide 56. Four groove forming walls 100 are arranged at equal peripheral intervals (See FIG. 7). In FIG. 7, reference numeral 106 indicates a through-hole formed in the upper wall portion 76 of the valve guide 56. The through-holes 106 partially correspond to the groove forming wall 100.

Further, each groove forming wall 100 is formed in a U-shaped configuration having a pair of side wall portions 101 and 102 and a bottom wall portion 103 connecting and the lower end portions of the two side wall portions 101 and 102. Each engagement groove 98 is formed by the groove forming wall 100 such that the engagement groove 98 opens inwardly in the radial direction of the tube wall portion 75 of the valve guide 56 and have a vertical-groove shape extending in the vertical direction. As seen from the outer side in the radial direction of the tube wall portion 75 of the valve guide 56, the left-hand-side side wall portion 101 of the groove forming wall 100 is referred to as the left-hand side wall portion 101; and the right-hand-side side wall portion 102 is referred to as the right-hand side wall portion 102. The left-hand side wall portion 101 extends upwards to be connected to the upper wall portion 76 of the valve guide 56. An opening 104 is formed between the right-hand side wall portion 102 and the upper wall portion 76 of the valve guide 56. Each connection groove 98 may correspond to the "connection recess" as referred to in the present specification.

Figure 9:
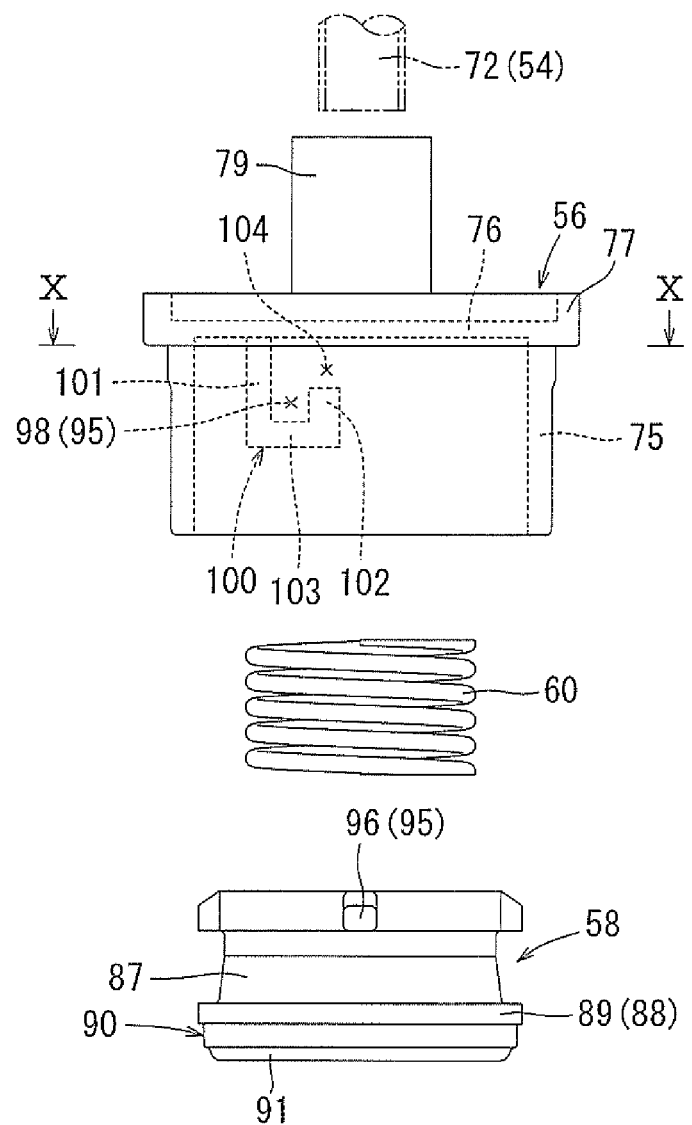
FIG. 9 is a schematic front view illustrating a state prior to the mounting of the valve body with respect to the valve guide.
Figure 10:
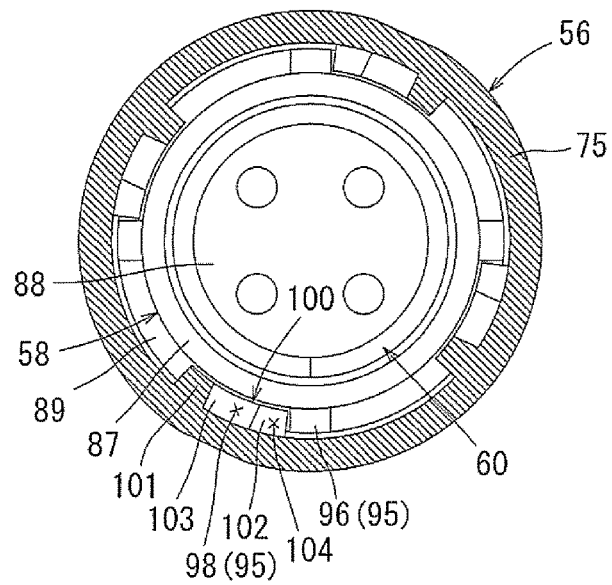
FIG. 10 is a cross-sectional view taken along line X-X in FIG. 9.
Figure 11:
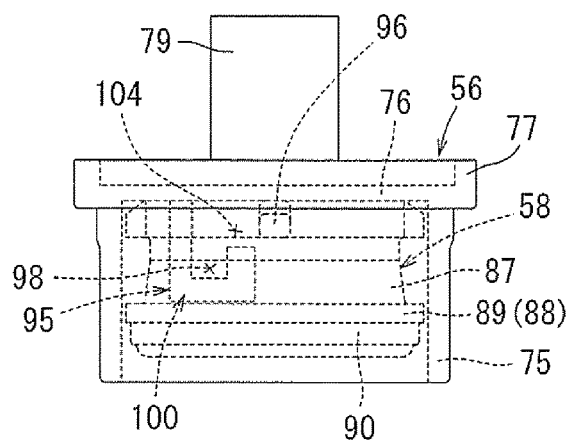
FIG. 11 is a schematic front view illustrating mounting step 1 for the valve body to the valve guide.
Figure 12:
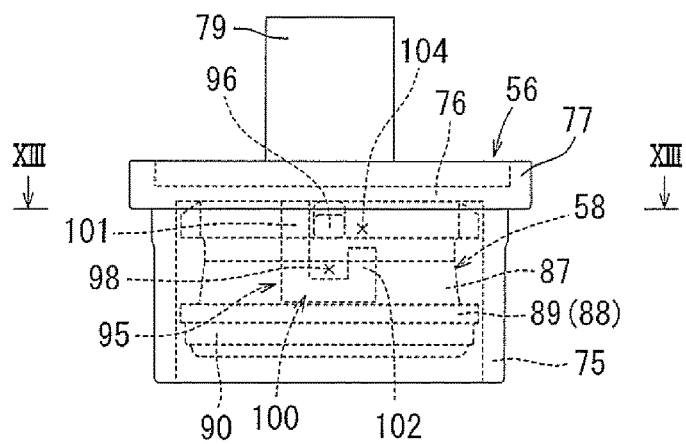
FIG. 12 is a schematic front view illustrating mounting step 2 for the valve body to the valve guide.
Figure 14:
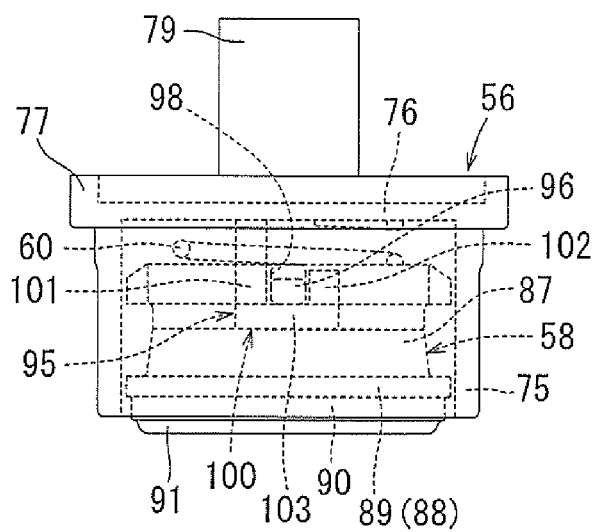
FIG. 14 is a schematic front view illustrating mounting step 3 for the valve body to the valve guide

Next, the mounting procedures (connecting procedures) for the valve body 58 with respect to the valve guide 56 will be described. FIG. 9 is a schematic front view illustrating a state prior to the mounting of the valve body to the valve guide. FIG. 10 is a cross-sectional view taken along line X-X of FIG. 9. FIG. 11 is a schematic front view illustrating mounting step 1 for the valve body to the valve guide. FIG. 12 is a schematic front view illustrating mounting step 2 for the same. FIG. 13 is a cross-sectional view taken along line XIII-XIII of FIG. 12. FIG. 14 is a schematic front view illustrating mounting step 3 for the valve body to the valve guide.

[Mounting Step 1] In the state prior to the mounting (See FIG. 9), the tube shaft portion 79 of the valve guide 56 is threadably engaged with the output shaft 72 of the stepping motor 54 (See FIG. 2) prior to the installation in the valve casing 52. Further, the valve spring 60 is fit-engaged with the valve body 58. Subsequently, as seen in plan view (See FIG. 10), the valve guide 56 and the valve body 58 are situated in the peripheral direction such that the opening 104 side of the engagement groove 98 of the valve guide 56, i.e., the right-hand side wall portion 102 of the groove forming wall 100, is adjacent to the engagement protrusion 96 of the valve body 58. In this state, the valve body 58 is fit-engaged with the valve guide 56. Further, the valve body 58 is pushed upwards (in the opening direction) against the biasing force of the valve spring 60 until the tube wall portion 87 of the valve body 58 contacts the upper wall portion 76 of the valve guide 56 (See FIG. 11). As a result, the opening 104 of the engagement groove 98 and the engagement protrusion 96 face each other in the peripheral direction of the valve guide 56 and the valve body 58.

[Mounting Step 2] Next, as seen in plan view, the valve guide 56 and the valve body 58 are caused to make relative rotation. For example, in plan view (See FIG. 10), the valve guide 56 is rotated to the left with respect to the valve body 58. As a result, the engagement protrusion 96 of the valve body 58 enters the engagement groove 98 of the valve guide 56 via the opening 104 (See FIGS. 12 and 13). The engagement protrusion 96 abuts the left-hand side wall portion 101 of the groove forming wall 100, thereby further rotation of the valve body 58 is regulated.

[Mounting Step 3] Next, the push-up force with respect to the valve body 58 is released. Then, the valve body 58 is pushed down due to the elastic restoring force of the valve spring 60 (See FIG. 14). At the same time, the engagement protrusion 96 moves downwards along the engagement groove 98 to finally abut the bottom wall portion 103 of the engagement groove 98, thereby further downward movement (in the closing direction) of the valve body 58 is regulated. As a result, the engagement protrusion 96 is engaged with the engagement groove 98 to be movable in the vertical direction (axial direction) while regulated in the movement in the right-left direction by both side wall portions 101 and 102 of the groove forming wall 100. In this state, the seal portion 91 of the seal member 90 of the valve body 58 protrudes downwards beyond the lower end surface of the tube wall portion 75 of the valve guide 56. In the manner as described above, the valve body 58 is connected to the valve guide 56 to be movable in the vertical direction (axial direction) while regulated in its movement around the axis. The assembly formed by the valve guide 56, the valve body 58, and the valve spring 60 is referred to as the "valve assembly."

Next, the valve assembly (See FIG. 14) is arranged inside the valve chamber 62 of the valve casing 52, and the stepping motor 54 is mounted on the valve casing 52, thereby the flow rate control valve 38 is completed (See FIG. 3). The flow rate control valve 38 is provided as the closing valve 38 in the vapor passage 31 of the fuel vapor processing apparatus 12 (See FIG. 1). For example, the fuel tank 15 side passage portion 31a of the vapor passage 31 is connected to the inflow passage 63 of the valve casing 52, and the canister 34 side passage portion 31b of the vapor passage 31 is connected to the outflow passage 64. The valve casing 52 is mounted to a fixation member on the vehicle body (not shown) by a bolt or the like.

Next, the operation of the flow rate control valve 38 will be described.

(1) Valve-open state of the flow rate control valve 38: As shown in FIG. 3, in the open state of the flow rate control valve 38, the valve guide 56 and the valve body 58 (including the seal member 90) have been moved to the position above the valve seat 67 of the valve casing 52. Further, the valve body 58 is downwardly biased to the valve guide 56 by the elasticity of the valve spring 60, and the engagement protrusion 96 of the valve body 58 is held in contact with the bottom wall portion 103 of the engagement groove 98 of the valve guide 56. Thus, the valve guide 56 and the valve body 58 are connected to each other via the connector 95.

Further, the valve guide 56 is stroke-controlled in the axial direction via the feed screw mechanism 83 by the stepping motor 54 based on the drive control of the stepping motor 54 by the ECU 45. As a result, the valve body 58 ascends and descends together with the valve guide 56, thereby the opening amount (lift amount) of the valve body 58 is adjusted. Further, even if, in the valve-open state, the stepping motor 54 is turned OFF, the valve-open state may be maintained by the detent torque of the stepping motor 54, the lead angle of the feed screw mechanism 83, etc.

(2) When the flow rate control valve 38 is closed: When, in the valve-open state (See FIG. 3), the stepping motor 54 is operated to close the valve by the ECU 45, the output shaft 72 is rotated in the closing direction, thereby the valve guide 56 and the valve body 58 move downwards (in the closing direction), i.e., descend, by the feed screw mechanism 83. Then, the valve body 58 (more specifically, the seal member 90) gets seated on the valve seat 67, thereby the downward movement of the valve body 58 is regulated. Subsequently, the valve guide 56 further descends. At the same time, the bottom wall portion 103 of the engagement groove 98 of the valve guide 56 is downwardly spaced away from the engagement protrusion 96 of the valve body 58. That is, the engagement protrusion 96 moves relatively upwards along the engagement groove 98. As a result, the connection between the valve guide 56 and the valve body 58 by the connector 95 is released. At the same time, the valve spring 60 is compressed.

And, before the lower end surface of the tube wall portion 75 of the valve guide 56 abuts the valve seat 67, the ECU 45 stops the valve closing operation of the stepping motor 54 (See FIG. 2). As a result, the valve guide 56 is situated at a non-contact position with respect to the valve seat 67. This state is the valve-closed state. Alternatively, the ECU 45 may not stop the valve-closing operation of the stepping motor 54 until the lower end surface of the tube wall portion 75 of the valve guide 56 abuts the valve seat 67, causing the lower end surface of the tube wall portion 75 of the valve guide 56 to abut the valve seat 67. After that, the stepping motor 54 may perform the valve-opening operation to attain a valve-closed state in which the valve guide 56 is spaced away from the valve seat 67 before stopping the valve-opening operation of the stepping motor 54.

(3) Valve-closed state of the flow rate control valve 38: In the valve-closed state of the flow rate control valve 38 (See FIG. 2), the valve body 58 is elastically maintained in the state in which it is seated on the valve seat 67 by the biasing force of the valve spring 60. Sealing is elastically affected between the valve body 58 and the valve seat 67 of the valve casing 52 by the seal member 90. Further, if, in the valve-closed state, the electricity supply to the stepping motor 54 is turned OFF, the valve-closed state may be maintained by the detent torque of the stepping motor 54, the lead angle of the feed screw mechanism 83, etc.

In the valve-closed state of the flow rate control valve 38 (See FIG. 2), a change in temperature may cause a change in the dimension of the valve casing 52, in particular, a change in the dimension in the axial direction, i.e., in the vertical direction, of the valve body 58. For example, when the valve casing 52 expands in the vertical direction (the axial direction) of the valve body 58, the distance (interval) between the stepping motor 54 and the valve seat 67 increases, at the same time the valve body 58 may move downwards (in the closing direction) by the biasing of the valve spring 60. Thus, the sealing force between the valve body 58 and the valve seat 67 may be maintained. At this time, the gap between the valve seat 67 of the valve casing 52 and the valve guide 56 increases; this, however, involves no particular problem.

When the valve casing 52 contracts in the vertical direction (the axial direction) of the valve body 58, the distance (interval) between the stepping motor 54 and the valve seat 67 decreases, at the same time the valve body 58 moves upwards (in the opening direction) with respect to the valve guide 56 against the biasing of the valve spring 60. Thus, the valve body 58 is not be forcibly contacted to the valve seat 67, causing no defective operation. At this time, the gap between the valve seat 67 of the valve casing 52 and the valve guide 56 is reduced, which involves no particular problem.

(4) When the flow rate control valve 38 is opened: When, in the valve-closed state (See FIG. 2), the stepping motor 54 performs the valve-opening operation by the ECU 45, the output shaft 72 is rotated in the valve-opening direction, thereby the valve guide 56 moves upwards (in the opening direction) via the feed screw mechanism 83, i.e., ascends. At the same time, the engagement groove 98 of the valve guide 56 moves upwards along the engagement protrusion 96 of the valve body 58. At this time, the valve spring 60 expands due to its elastic restoring force. And, the bottom wall portion 103 of the engagement groove 98 abuts the engagement protrusion 96 of the valve body 58. As a result, the relative movement of the valve guide 56 and the valve body 58 is regulated. Thus, the valve guide 56 and the valve body 58 are connected together via the connector 95. Subsequently, the valve guide 56 and the valve body 58 are further raised. As a result, the seal member 90 of the valve body 58 is separated from the valve seat 67 of the valve casing 52, thereby the valve-open state is attained (See FIG. 3).

(5) Initialization of the origin position of the stepping motor 54 of the flow rate control valve 38: When initializing the origin position of the stepping motor 54, the ECU 45 causes the stepping motor 54 to perform the valve-closing operation to cause the valve guide 56 to abut the valve seat 67 of the valve casing 52 (See FIG. 4). In the present embodiment, when the valve guide 56 abuts the valve seat 67 of the valve casing 52, further movement of the valve guide 56 in the closing direction is regulated, the stepping motor 54 loses step, and the position corresponding to the point in this time is regarded as the origin position of the stepping motor 54. The ECU 45 performs the drive control of the stepping motor 54 from this onward by using the origin position as a reference. The initialization of the origin position of the stepping motor 54 may be preferably performed, for example, before the first valve-opening operation of the flow rate control valve 38 after the start of the engine 14.

When performing the initialization of the origin position of the stepping motor 54, the ECU 45 causes the stepping motor 54 to perform the valve-closing operation, causing the valve guide 56 to abut the valve seat 67 of the valve casing 52. As a result, at the time of initialization of the origin position of the stepping motor 54, as compared with the case where the valve body 58 is caused to abut the valve seat 67, it is possible to improve the durability of the valve body 58 (more specifically, the seal member 90). The valve seat 67 (more specifically, the outer peripheral portion thereof) of the valve casing 52 may correspond to the "contact portion" as referred to in the present specification. The contact portion is not restricted to the valve seat 67, but any other member may do so long as it regulates the movement in the closing direction of the valve guide 56.

As described above, in the above flow rate control valve 38, in the closed state, the connection between the valve guide 56 and the valve body 58 by the connector 95 is released, with the valve body 58 seated on the valve seat 67; and the valve guide 56 is situated at the non-contact position spaced away from the valve seat 67 of the valve casing 52. When, in this closed state, the valve casing 52 expands in the vertical direction (axial direction) of the valve body 58 due to a change in temperature, the distance (interval) between the stepping motor 54 and the valve seat 67 increases, at this time the valve body 58 moves downwards (in the closing direction) with respect to the valve guide 56 due to the biasing of the valve spring 60. Thus, the sealing force between the valve body 58 and the valve seat 67 may be maintained. When the valve casing 52 contracts in the vertical direction (axial direction) of the valve body 58, the distance (interval) between the stepping motor 54 and the valve seat 67 decreases, at this time the valve body 58 moves upwards (in the opening direction) with respect to the valve guide 56 against the biasing of the valve spring 60. Thus, the valve body 58 is not tightened, causing no defective operation. Thus, it is possible to avoid the problems due to dimensional changes in the valve casing 52 in the valve-open state.

Further, it is possible to set the lead angle of the feed screw mechanism 83 small, so that, unlike such countermeasure as setting the lead angle large, there is no need for a stepping motor 54 of a large thrust, so that it is possible to suppress an increase in size and cost. Further, in the non-energized state of the stepping motor 54, the valve body 58 is not inadvertently opened or closed but is maintained at a predetermined position, so that it is possible to suppress power consumption. Further, it is possible to reduce the stroke resolution of the valve body 58, that is, the stroke amount of the valve body 58 per 1 step of the stepping motor 54, making it possible to improve the flow rate control property.

The connector 95 may be composed of the engagement protrusion 96 provided on the valve body 58, and the engagement groove 98 to be engaged with the engagement protrusion 96 to allow movement within a predetermined range in the vertical direction (axial direction). Thus, the valve guide 56 and the valve body 58 may be connected to allow movement thereof within a predetermined range in the vertical direction (axial direction) through the engagement between the engagement protrusion 96 and the engagement groove 98 of the connector 95. Thus, the valve guide 56 and the valve body 58 may be easily connected.

Further, the engagement groove 98 is provided with the opening 104 that allows the engagement protrusion 96 to get in and out through relative displacement around the axis with the valve body 58 moved upwards (in the opening direction) with respect to the valve guide 56, and the opening 104 of the engagement groove 98 is arranged at a position where it is not aligned with the engagement protrusion 96 making relative movement in the vertical direction (axial direction) with the opening/closing operation. Thus, through relative displacement around the axis with the valve body 58 moved upwards (in the opening direction) with respect to the valve guide 56, it is possible to engage and disengage the engagement protrusion 96 with and from the engagement groove 98 via the opening 104. As a result, it is possible to easily engage and disengage the engagement protrusion 96 and the engagement groove 98 without utilizing elastic deformation.

Further, the opening 104 of the engagement groove 98 of the valve guide 56 and the engagement protrusion 96 of the valve body 58 are arranged in a positional relationship in which they are not aligned during the opening/closing operation of the flow rate control valve 38. Thus, it is possible to prevent the engagement protrusion 96 from being inadvertently detached from the engagement groove 98 in relation to the opening/closing operation of the flow rate control valve 38.

Further, the valve spring 60 between the valve guide 56 and the valve body 58 may be employed as the biasing means (elastic member) for biasing the valve body 58 in the closing direction. Thus, as compared with the case where weight of the valve body 58, the repulsive force of the magnet, etc. is used as the biasing means, the valve spring 60 may bias the valve body 58 downwards (in the closing direction) in a stable manner.

Further, the valve spring 60 may be a coil spring arranged concentrically with respect to the valve guide 56 and the valve body 58. Thus, the coil spring may absorb the inclination of the valve body 58 generated through design toleration, mounting, etc. As a result, the sealing property at the time of valve-closing (more specifically, the sealing property between the valve body 58 and the valve seat 67) may be improved.

Further, the valve body 58 has a cylindrical tube wall portion 87 arranged on the outer peripheral side of the valve spring 60, and the valve guide 56 has a tube wall portion 75 to be fit-engaged with the outer peripheral side of the tube wall portion 87 of the valve body 58. Thus, the fit-engagement of the tube wall portion 87 of the valve body 58 and the tube wall portion 75 of the valve guide 56 allows the valve body 58 and the valve guide 56 to move in the vertical direction (axial direction) in a stable manner while suppressing swing thereof in a radial direction.

Figure 15:
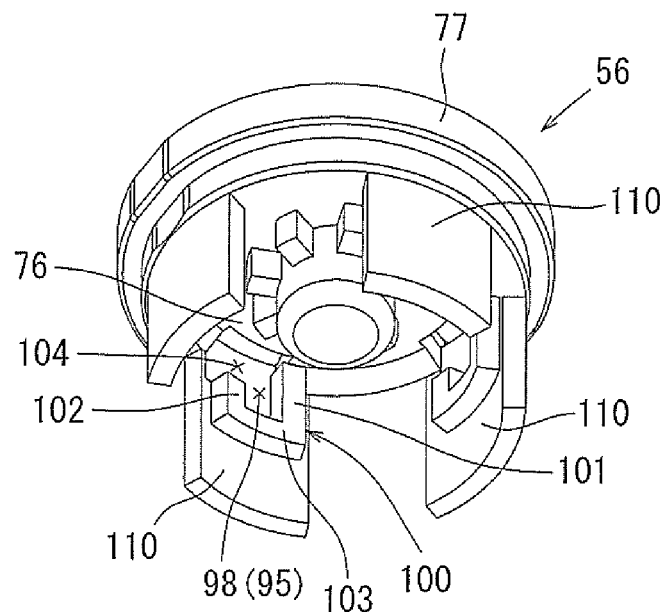
FIG. 15 is a perspective view of a modification of the valve guide.

The following modification of the tube wall portion 75 of the valve guide 56 will be possible. FIG. 15 is a perspective view of a modification of the valve guide. As shown in FIG. 15, the tube wall portion 75 (See FIG. 6) of the valve guide 56 may be replaced by a plurality of (e.g., four) wall portions 110 intermittently formed in the circumferential direction of the valve guide 56. The inner side surface of each wall portion 110 is provided with the engagement groove 98. The configuration of the tube wall portion 75 and the plurality of wall portions 110 of the valve guide 56 is not restricted to the cylindrical one, but any other configuration will do so long as it allow fit-engagement with the outer peripheral side of the tube wall portion 87 (See FIG. 6) of the valve body 58. Further, the configuration of the tube wall portion 87 (See FIG. 6) of the valve body 58 is not restricted to the cylindrical one, but it may also be a prism-like one, or may be formed by a plurality of wall portions intermittently formed in the peripheral direction.

The fuel vapor processing apparatus 12 (See FIG. 1) may include the flow rate control valve 38 as the closing valve 38. Thus, it is possible to provide a fuel vapor processing apparatus 12 having a flow rate control valve 38 capable of avoiding problems due to a change in the dimension of the valve casing 52 in the valve-closed state.

Figure 16:
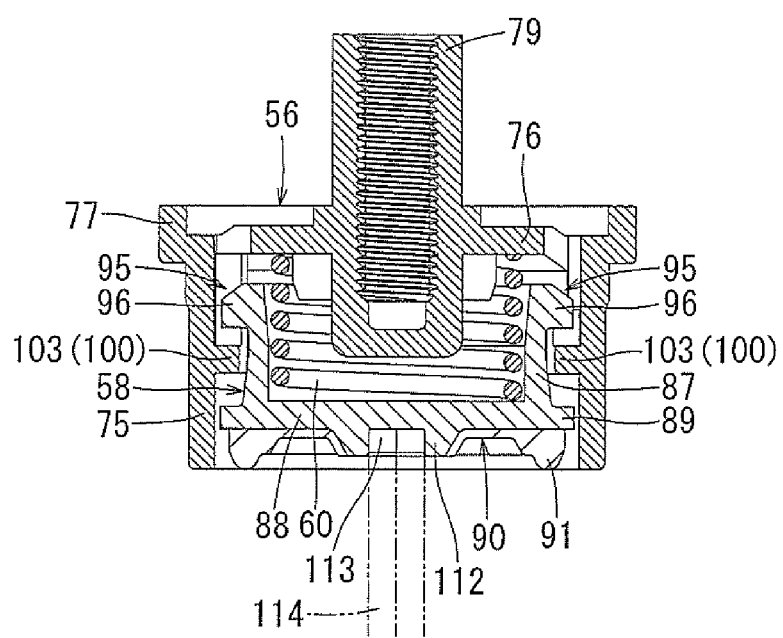
FIG. 16 is a front cross-sectional view of a valve assembly in accordance with a second embodiment.
Figure 17:
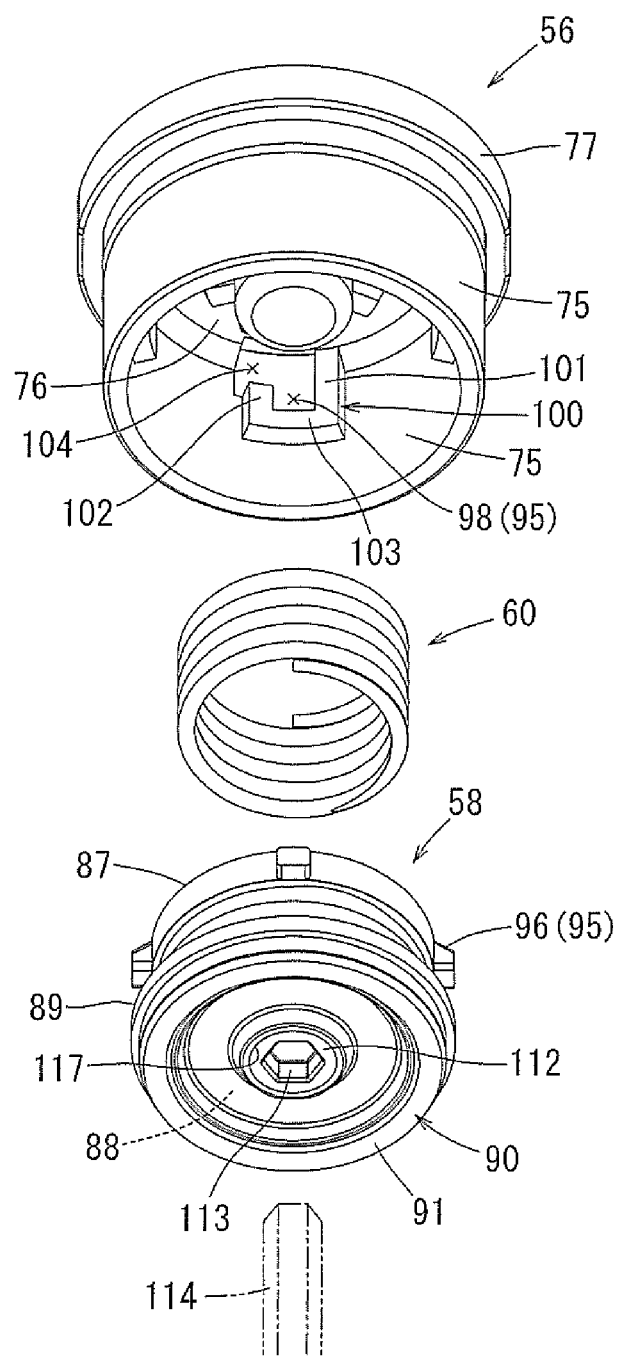
FIG. 17 is an exploded perspective view of a valve guide, a valve body, and a valve spring.

The Second embodiment will now be described. The second embodiment is a modification of the first embodiment, so the following description will center on the modified portions, and a redundant description will be left out. FIG. 16 is a front cross-sectional view of a valve assembly, and FIG. 17 is an exploded perspective view of a valve guide, a valve body, and a valve spring. As shown in FIGS. 16 and 17, in the present embodiment, a reverse-truncated-cone-shaped swollen portion 112 is formed at the center of the lower surface of the lower wall portion 88 of the valve body 58 of the first embodiment. A downwardly open tool engagement groove 113 may be formed in the lower surface of the swollen portion 112. The tool engagement groove 113 is formed, for example, as a hexagonal hole. The tool engagement groove 113 is formed to allow engagement and disengagement of a tool 114 (more specifically, the engagement side distal end portion thereof) such as a hexagonal wrench or a hexagonal bar. The tool engagement groove 113 may correspond to the "tool engagement portion" as referred to in the present specification. A circular opening hole 117

(See FIG. 17) may be formed at the center of the seal member 90 for exposing the lower end surface of the swollen portion 112.

In the present embodiment, when mounting the valve body 58 to the valve guide 56, the tool 114 (more specifically, the engagement side distal end portion thereof) is engaged with the tool engagement groove 113 of the valve body 58. And, the valve body 58 is rotated with respect to the valve guide 56 while pressed against the same by the tool 114. That is, the valve body 58 is axially forced into the valve guide 56 against the biasing of the valve spring 60, and then the valve body 58 is rotated. As a result, the engagement protrusion 96 of the valve body 58 is engaged with the engagement groove 98 (See FIG. 17) of the valve guide 56. In this way, the valve guide 56 can be mounted to the valve body 58.

Thus, unlike the case where the valve body 58 is directly mounted to the valve guide 56 by the hand of the worker, it is possible to suppress defects such as adhesion of foreign matter to the valve body 58, flawing of the valve body 58, etc. For example, in the first embodiment, when the valve body 58 is directly mounted to the valve guide 56 by the hand of the worker, fingers of the worker will touch with the seal portion 91 of the seal member 90 of the valve body 58, so that there is the possibility of foreign matter adhering to the seal portion 91 or of the seal portion 91 being flawed. When, however, the tool 114 is used, it is possible to suppress such a problem. After the mounting of the valve body 58 to the valve guide 56, the tool 114 may be detached from the tool engagement groove 113 of the valve body 58. Further, it is also possible to dismantle the assembly of the valve guide 56 and the valve body 58 in an order reverse to that of the mounting. The tool 114 may be a generally used one or a dedicated one.

Figure 18:
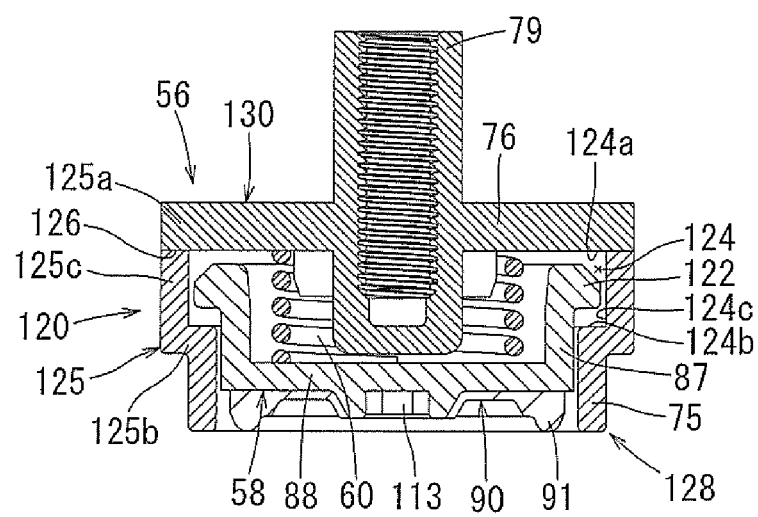
FIG. 18 is a front cross-sectional view of a valve assembly in accordance with a third embodiment.
Figure 19:
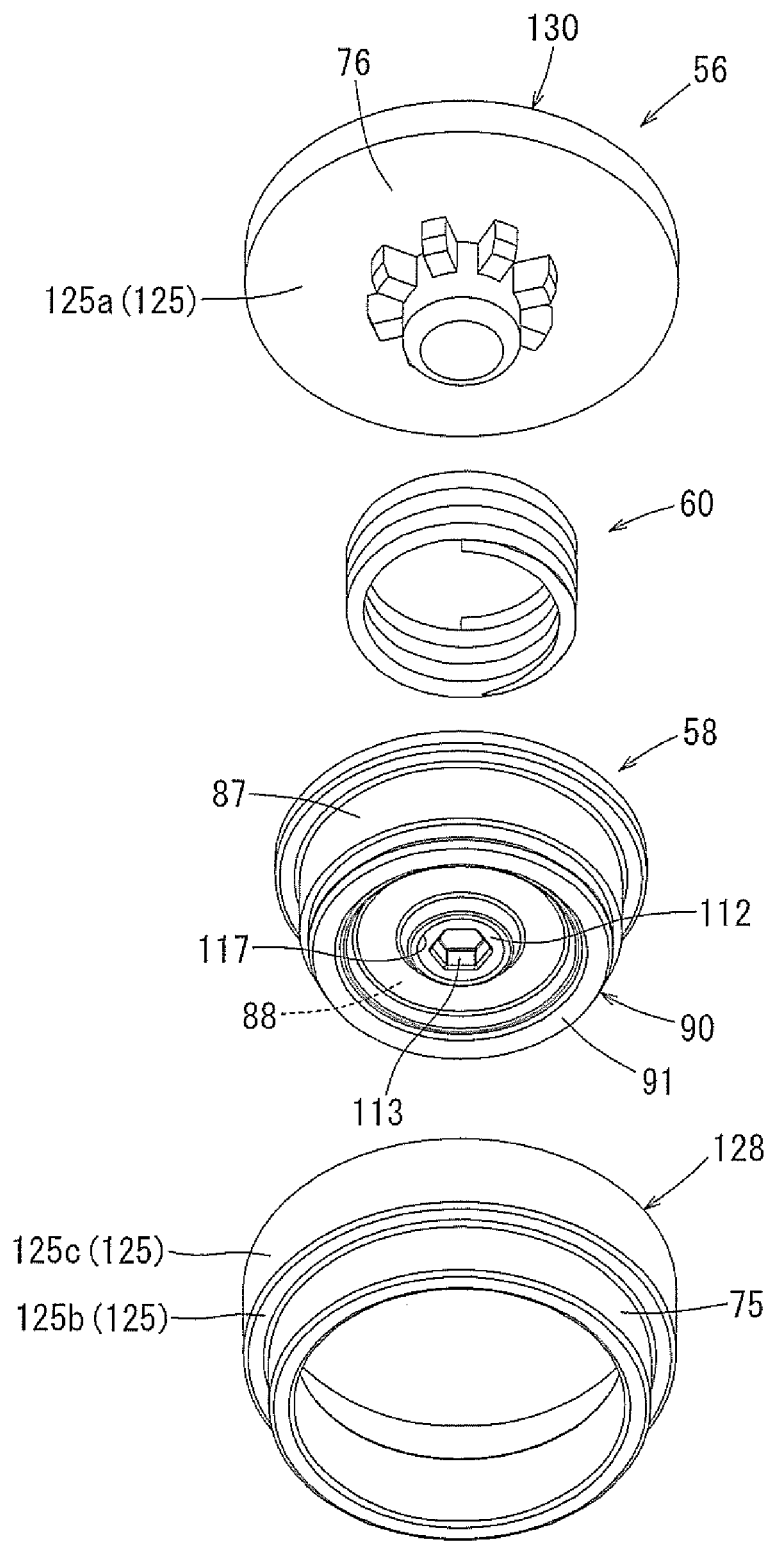
FIG. 19 is an exploded perspective view of a valve guide, a valve body and a valve spring.

The Third embodiment will now be described. The third embodiment is a modification of the first embodiment, so the following description will center on the modified portions, and a redundant description will be left out. FIG. 18 is a front cross-sectional view of a valve assembly. FIG. 19 is an exploded perspective view of a valve guide, a valve body and a valve spring. As shown in FIG. 18, in the present embodiment, the connector 95 (See FIG. 6) of the first embodiment, which includes the engagement protrusions 96 and the engagement grooves 98, is changed to a connector 120. As in the second embodiment, the tool engagement groove 113 is formed in the valve body 58. The tool engagement groove 113 may be omitted. Further, the extension wall portion 77 of the valve guide 56 and the flange portion 89 of the valve body 58 in the first embodiment (See FIG. 6) may not be formed.

The connector 120 is provided between the tube wall portion 75 of the valve guide 56 and the tube wall portion 87 of the valve body 58. The connector 120 may include an engagement protrusion 122 formed on the tube wall portion 87 of the valve body 58 and an engagement groove 124 formed in the tube wall portion 75 of the valve guide 56. The engagement protrusion 122 may include an annular rib protruding radially outwards from the outer peripheral side of the upper end portion of the tube wall portion 87 of the valve body 58. The engagement protrusion 122 may correspond to the "connection protrusion" as referred to in the present specification.

The engagement groove 124 may be formed by an annular groove forming wall 125 provided at the upper end portion of the tube wall portion 75 of the valve guide 56. The groove forming wall 125 is formed in a U-shaped cross-sectional configuration open radially inwards. The groove forming wall 125 has an upper groove wall portion 125a, a lower groove wall portion 125b, and a groove bottom wall portion 125c. The upper groove wall portion 125a is continuously formed at the outer peripheral portion of the upper wall portion 76 of the valve guide 56. An annular engagement groove 124 open radially inwards is formed in the inner peripheral side of the tube wall portion 75 of the valve guide 56 by the groove forming wall 125. The engagement groove 124 may be formed in a rectangular sectional configuration, and has an upper groove wall surface 124a, a lower groove wall surface 124b, and a groove bottom surface 124c. Each groove wall surfaces 124a and 124b may be a plane orthogonal or substantially orthogonal to the axis (center line) of the valve guide 56. The upper groove wall surface 124a is flush with the lower surface of the upper wall portion 76 of the valve guide 56. The engagement groove 124 may correspond to the "connection recess" as referred to in the present specification.

The engagement protrusion 122 of the valve body 58 is engaged with the engagement groove 124 of the valve guide 56 to be movable in the vertical direction (axial direction) with a predetermined movement stroke. Further, the valve guide 56 is divided into two to open the engagement groove 124 in the axial direction (vertical direction). In the present invention, the valve guide 56 is divided into two in the vertical direction (axial direction) (See FIG. 19), with a plane including the upper groove wall surface 124 of the groove forming wall 125 serving as a parting line 126. The member on the tube wall portion 75 side is referred to as a tubular member 128, and the member on the upper wall portion 76 side is referred to as an end wall member 130. The tubular member 128 and the end wall member 130 are formed through resin molding. No through-hole 106 of the first embodiment (See FIG. 7) may be formed in the upper wall portion 76 of the valve guide 56.

Next, the procedures for mounting the valve body 58 to the valve guide 56 (connection procedures) will be described. In the state shown in FIG. 19, the valve body 58 is fit in the tubular member 128 from above, and the engagement protrusion 122 of the valve body 58 is fit in the engagement groove 124, which is upwardly open. Further, the valve spring 60 is fit in the valve body 58. Subsequently, the upper groove wall portion 125a of the upper wall portion 76 of the end wall member 130 is brought into contact with the groove bottom wall portion 125c of the tubular member 128 against the biasing of the valve spring 60. As a result, the upper opening surface of the engagement groove 124 is closed by the upper groove wall portion 125a, and the engagement protrusion 122 is accommodated in, i.e., engaged with, the engagement groove 124 to be movable in the vertical direction (axial direction) (See FIG. 18). In this state, the tubular member 128 and the end wall member 130 may be bonded together through fusion-bonding at the parting line 126 of the groove forming wall 125. Fusion-bonding may correspond to the "bonding means" as referred to in the present specification.

According to the present embodiment, unlike the case where the engagement protrusion is engaged and disengaged with and from the engagement groove 124 around the axis (See the first embodiment), the space in the axial direction (vertical direction) for the engagement and disengagement (the axial space required for the opening 104 (See FIG. 6)) may be omitted. Thus, it is possible to simplify the configuration of the engagement groove 124, and/or to make the valve guide 56 compact in the axial direction (vertical direction).

Further, the tubular member 128 and the end wall member 130 are bonded to each other while the engagement protrusion 122 is accommodated in the engagement groove 124, thereby the valve guide 56 is formed. Thus, the engagement groove 124 and the engagement protrusion 122 of the connector 120 may be easily connected.

Figure 20:
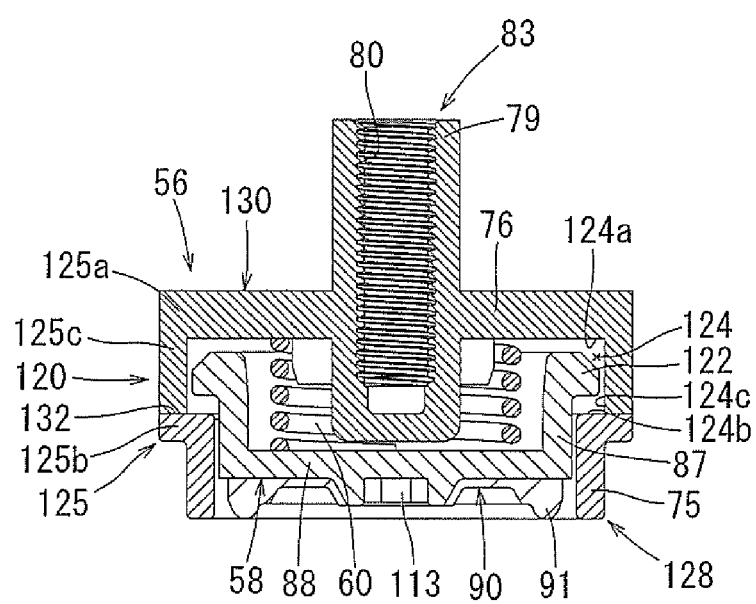
FIG. 20 is a front cross-sectional view of a valve assembly in accordance with a fourth embodiment.
Figure 21:
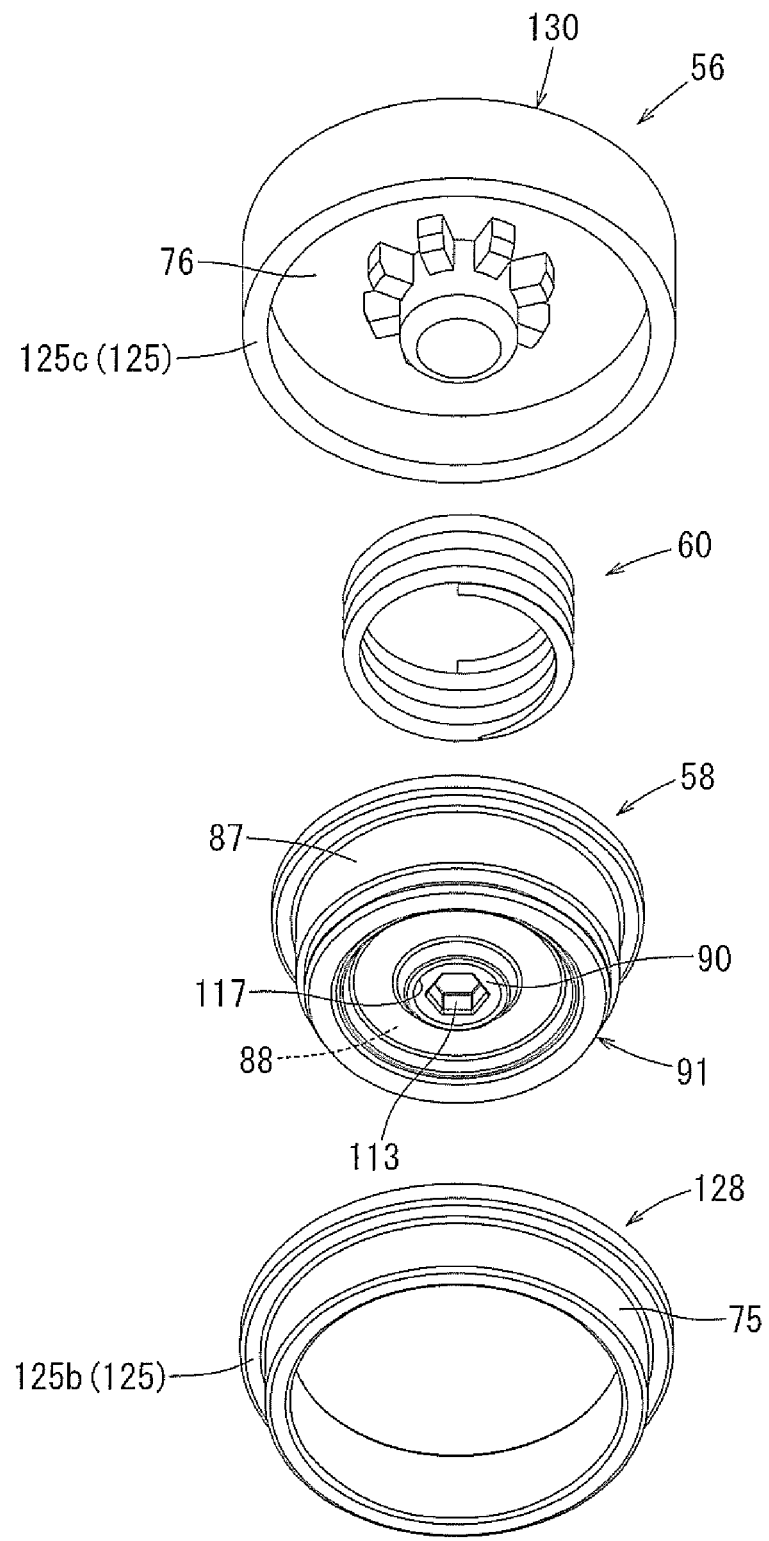
FIG. 21 is an exploded perspective view of a valve guide, a valve body and a valve spring.

The Fourth embodiment will now be described. The present embodiment is a modification of the third embodiment, so the following description will center on the modified portions, and a redundant description will be left out. FIG. 20 is a front cross-sectional view of a valve assembly, and FIG. 21 is an exploded perspective view of a valve guide, a valve body and a valve spring. As shown in FIG. 20, the parting line 126 (See FIG. 18) of the valve guide 56 of the third embodiment is changed to a parting line (indicated by reference numeral 132). That is, the valve guide 56 is divided into two in the vertical direction (axial direction), with a plane including the lower groove wall surface 124b of the groove forming wall 125 serving as the parting line 132 (See FIG. 21). Thus, a groove bottom wall portion 125c is formed at the end wall member 130. The present embodiment also may provide the same advantageous effect as that of the third embodiment.

The present invention is not restricted to the above embodiments but allows modifications without departing from the scope of the gist of the invention. For example, apart from the stepping motor 54, a DC motor allowing the control of the rotational direction, rotational speed, and rotation amount as the electric motor of the flow rate control valve 38 may also be employed. In the case of the DC motor, a stroke sensor detecting the position of the valve guide 56 may be utilized for performing of the initialization of the origin position. The electric motor may be provided with an output shaft 72 movable in the axial direction due to the built-in feed screw mechanism 83. In this case, the valve guide 56 may be integrally connected to the output shaft 72. Further, the object of application of the flow rate control valve 38 of the present invention is not restricted to the closing valve 3 of the fuel vapor processing apparatus 12. The flow rate control valve 38 may be applicable to any other use. Further, the valve spring 60 biasing the valve body 58 in the closing direction may be changed into configurations utilizing the weight of the valve body 58 and the repulsive force of a magnet. Further, the number of sets of connector 95 may be increased or decreased as appropriate. Further, the arrangement of the engagement protrusion 96 and the engagement groove 98 of the connector 95 may be reversed; that is, the engagement protrusion 96 may be provided on the valve guide 56 while the engagement groove 98 may be provided in the valve body 58. Further, the connector 95 may be a snap-fit type.

Further, the tool engagement groove 113 is not restricted to the hexagonal hole but may be a hole of some other configuration such as a rectangular hole. Further, the tool engagement portion may be a tool engagement protrusion of a hexagonal-prism-shaped configuration or a rectangular-prism-shaped configuration instead of the tool engagement groove 113. Further, the tool engagement portion may be formed in the lower wall portion 88 of the valve body 58 without the swollen portion 112. Further, the engagement protrusions 122 may be formed intermittently in the peripheral direction. In this case, the engagement grooves 124 may be formed intermittently in the peripheral direction to be in correspondence with the engagement protrusions. Further, apart from the fusion-bonding, the bonding means for bonding the tubular member 128 and the end wall member 130 may also be some other bonding means such as adhesion, fastening, clipping, or heat crimping. Further, depending upon the bonding means, the tubular member 128 and/or the end wall member 130 may be formed of metal instead of resin.

The invention claimed is:

1. A flow rate control valve comprising:
a valve casing forming a fluid passage;
a valve seat provided in the fluid passage of the valve casing;
an electric motor mounted on the valve casing and drive-controlled by a controller;
a valve guide stroke-controlled in an axial direction by the electric motor via a feed screw mechanism;
a valve body configured to be placed and separated on and from the valve seat;
a connector connecting the valve guide and the valve body so as to allow them to move in the axial direction within a predetermined range;
a biasing means configured to bias the valve body in a closing direction; and
a contact portion provided on the valve casing and configured to limit the movement in the closing direction of the valve guide through contacting the valve guide,
wherein when closing the valve body, the controller controls the electric motor to attain a closed state such that a connection between the valve guide and the valve body by the connector is released, with the valve body being seated on the valve seat, and the valve guide being situated at a non-contact position spaced away from the contact portion of the valve casing.

2. The flow rate control valve of claim 1 wherein, when closing the valve body, the controller controls the electric motor to perform a valve closing operation to thereby place the valve body on the valve seat, and then the valve guide is further moved in the closing direction, whereby the connection between the valve guide and the valve body through the connector is released and the valve closing operation of the electric motor is stopped before the valve guide comes into contact with the contact portion of the valve casing, thereby to attain the closed state.

3. The flow rate control valve of claim 1 wherein, when closing the valve body, the controller controls the electric motor to perform a valve closing operation to thereby place the valve body on the valve seat, and then the valve guide is further moved in the closing direction, whereby the connection between the valve guide and the valve body through the connector is released, further the controller controls the electric motor to perform a valve opening operation after the valve guide contacts the contact portion of the valve casing to thereby place the valve guide at a position spaced away from the contact portion of the valve casing, and then the valve opening operation of the electric motor is stopped, thereby to attain the closed state.

4. The flow rate control valve of claim 1 wherein the connector includes a connection protrusion provided on one of the valve guide and the valve body and a connection recess provided on the other and configured to be engaged with the connection protrusion so as to allow movement in the axial direction within the predetermined range.

5. The flow rate control valve of claim 4 wherein:
the connection recess includes an opening configured to allow the connection protrusion to get in and out through relative displacement around an axis while the valve body is moved in an opening direction with respect to the valve guide; and the opening of the connection recess and the connection protrusion are arranged in a positional relationship in which they are not aligned in an opening and closing operation.

6. The flow rate control valve of claim 5 wherein the valve body includes a tool engagement portion configured to be detachably engaged with a tool for rotating the valve body.

7. The flow rate control valve of claim 4 wherein:
the valve guide includes a tubular tube wall portion;
the valve body includes a tube wall portion to be fit-engaged with the tube wall portion of the valve guide;
the connector is provided between the tube wall portion of the valve guide and the tube wall portion of the valve body;
the connection protrusion protrudes radially outwards from the tube wall portion of the valve body; and
the connection recess is open radially inwards on an inner peripheral side of the tube wall portion of the valve guide.

8. The flow rate control valve of claim 7 wherein:
the valve guide is divided into two so that the connection recess is opened in the axial direction; and
resultant two members are bonded together while accommodating the connection protrusion in the connection recess.

9. The flow rate control valve of claim 1 wherein the biasing means is an elastic member provided between the valve guide and the valve body.

10. The flow rate control valve of claim 9 wherein the elastic member is a coil spring arranged concentrically with respect to the valve guide and the valve body.

11. The flow rate control valve of claim 10 wherein:
the valve body includes a tubular tube wall portion arranged on an outer peripheral side of the coil spring; and
the valve guide includes a wall portion to be fit-engaged with an outer peripheral side of the tube wall portion of the valve body.

12. A fuel vapor processing apparatus comprising:
a canister capable of adsorbing and desorbing vapor generated in a fuel tank of a vehicle with an internal combustion engine mounted therein;
a vapor passage configured to allow fluid communication between the fuel tank and the canister;
a purge passage configured to allow fluid communication between the canister and an intake passage of the internal combustion engine;
a purge valve capable of opening and closing the purge passage;
a closing valve capable of opening and closing the vapor passage;
a controller configured to control the purge valve and the closing valve, and a flow rate control vale according to claim 1 as the closing valve.

* * * * *